United States Patent [19]

Kage et al.

[11] Patent Number: 5,602,818
[45] Date of Patent: Feb. 11, 1997

[54] LOCK MECHANISM FOR A FLOATING UNIT IN A DISC PLAYER

[75] Inventors: Shingo Kage, Kobe; Takehisa Takamiya, Hirakata; Tetsuhiko Takeda, Neyagawa; Yasunari Toyama, Osaka, all of Japan

[73] Assignee: Matsushita Electric Industrial Co., Ltd., Kadoma, Japan

[21] Appl. No.: 413,864

[22] Filed: Mar. 29, 1995

[30] Foreign Application Priority Data

Mar. 30, 1994 [JP] Japan .................................. 6-060787

[51] Int. Cl.$^6$ ................................................ G11B 17/028
[52] U.S. Cl. ............................................ 369/75.2; 369/75.1
[58] Field of Search ............................ 369/75.1, 75.2, 369/77.1, 99.02, 99.03, 99.06, 99.07

[56] References Cited

U.S. PATENT DOCUMENTS 4,628,498 12/1986 Takamatsu et al. ................ 369/77.1
5,084,855 1/1992 Kobayashi et al. ................ 369/75.2
5,132,958 7/1992 Camps et al. ..................... 369/77.1
5,142,522 8/1992 Muramatsu et al. ................ 369/75.1

Primary Examiner—Stuart S. Levy
Assistant Examiner—William R. Korzuch
Attorney, Agent, or Firm—Cushman, Darby & Cushman IP Group of Pillsbury Madison & Sutro LLP

[57] ABSTRACT

A disc player has a first lock unit and a second lock unit, which are driven by a reversible motor through the lock drive unit so as to lock a floating unit having a turntable in a transferring operation for the disc player and the disc. The first lock unit comprises a lock plate having lock pins, which engage with lock-pin receivers of the floating unit, and the second lock unit comprises a pair of locking members, which engage with a locking projection of the floating unit in the locking state.

7 Claims, 17 Drawing Sheets

LOCK MECHANISM FOR A FLOATING UNIT IN A DISC PLAYER

FIELD OF THE INVENTION AND RELATED ART STATEMENT

1. Field of the Invention

The present invention relates to a disc player, which is used for playing a compact disc, etc.

2. Description of the Related Art

A disc player to be installed in a motor vehicle generally has a floating unit including a turntable and an optical pickup. The floating unit is swingably supported by a chassis of the disc player through vibration-damping parts so that a disc, a turntable and optical pickup are insensitive to vibration during playing the disc.

In order to avoid undesirable large vibrations to the floating unit of conventional disc player, in a disc inserting or a disc ejecting operation, and in a disc-player carrying operation, the conventional floating unit endows with a locking mechanism such as shown in FIG. 17. FIG. 17 is a plan view showing interior units for one typical example of the locking mechanism of the conventional disc player, which was manufactured by the same assignee as the present invention.

As shown in FIG. 17, a chassis 200 of the conventional disc player has three chassis lock portions 201, 202 and 203 at rear side, right side and left side of the chassis 200. And a floating unit 204 in the chassis 200 is swingably supported by the chassis 200 through vibration-damping parts (not shown). When an optical pickup 205 of the floating unit 204 is arranged at an innermost position of the smallest radius of the disc to be played, a projection 206 of the optical pickup 205 pushes a first lever 207 to rotate around a shaft 211 in a direction shown by an arrow A in FIG. 17. At the same time, the first lever 207 pushes a second lever 208 to slide in a direction shown by an arrow B. When the second lever 208 is slid in the direction of arrow B, a first locking member 209 is rotated by the second lever 208 through an engagement portion to mesh with the first chassis locking portion 201, thereby locking the floating unit 204 against a backward movement.

And, since a third lever 212 is mechanically connected to the second lever 208 by a connector 213, the third lever 212 is rotated around a shaft 214 by the sliding operation of the second lever 208, and thereby a second locking member 215 is rotated by the third lever 212 through an engagement portion to mesh with the second chassis locking portion 202.

And further, since a fourth lever 216 is mechanically connected to the third lever 212 by a connector 217, the fourth lever 216 is rotated around a shaft 218 by the rotating operation of the third lever 212, and thereby a third locking member 219 is rotated by the fourth lever 216 through an engagement portion to mesh with the third chassis locking portion 203.

As a result, the floating unit 204 is locked to the chassis 200 when the optical pickup 205 reaches at the position of the innermost radius of the disc to be played. And, when the optical pickup 205 starts to slide in a direction of the outer radius of the disc, the above-mentioned conventional locking mechanism is set free because the optical pickup 205 is removed from the first lever 207.

The optical pickup 205 is driven so as to slide linearly by a drive motor 220 through a screw-rod 221.

In the locking state of the conventional disc player, if the floating unit 204 receives a large impactive force in a forward direction, unusually strong force is applied to the engagement portions of the locking members 209, 215, 219, the lever 208, 212, 216, and the chassis locking portions 201, 202, 203. Thereby these engagement portions are in danger of sticking between them, and getting damaged. Therefore, in the conventional disc player, there may be the case where the locking state of the floating unit 204 can not be released, and the optical pickup 205 can not be slid because of the undesirable catching of the engagement portions.

OBJECT AND SUMMARY OF THE INVENTION

The object of the present invention is to provide a disc player, which can release the locking state by using a simple mechanism even if the floating unit in the locking state receives a large impactive force.

In order to achieve the above-mentioned object, a disc player in accordance with the present invention comprises:

a chassis, a floating unit, which has a turntable rotating a disc, a pickup for reading data on said disc, and at least one lock-pin receiver at the side face thereof, and which is connected to the chassis through vibration-damping units, a lock unit having a lock plate, which is supported slidably in a forward direction and a backward direction in a side portion of the chassis, and which locks the floating unit at a forward position by inserting a lock pin of the lock plate into a narrow and shallow portion of the lock-pin receiver, and unlocks the floating unit at a backward position by removing the lock pin from the narrow and shallow portion of the lock-pin receiver, a rotary plate, which is connected to the lock unit through a connecting arm, and which is rotatably supported around a rotary shaft by the chassis so as to slide the lock plate in a forward direction and a backward direction by reversible rotations of the rotary plate, the rotary shaft being arranged to intersect at right angles to a line established between a connecting point of the connecting arm to the lock plate and the other connecting point to the rotary plate when the lock plate is positioned at the forward position, and a lock drive unit having a reversible motor, for driving the rotary plate.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all the Figures are schematic representations for purposes of illustration and do not necessarily depict the actual relative sizes or locations of the elements shown.

DESCRIPTION OF THE PREFERRED EMBODIMENT

Hereafter, a disc player of the preferred embodiment in accordance with the present invention will be described with reference to FIGS. 1 to 16.

Figure 1:
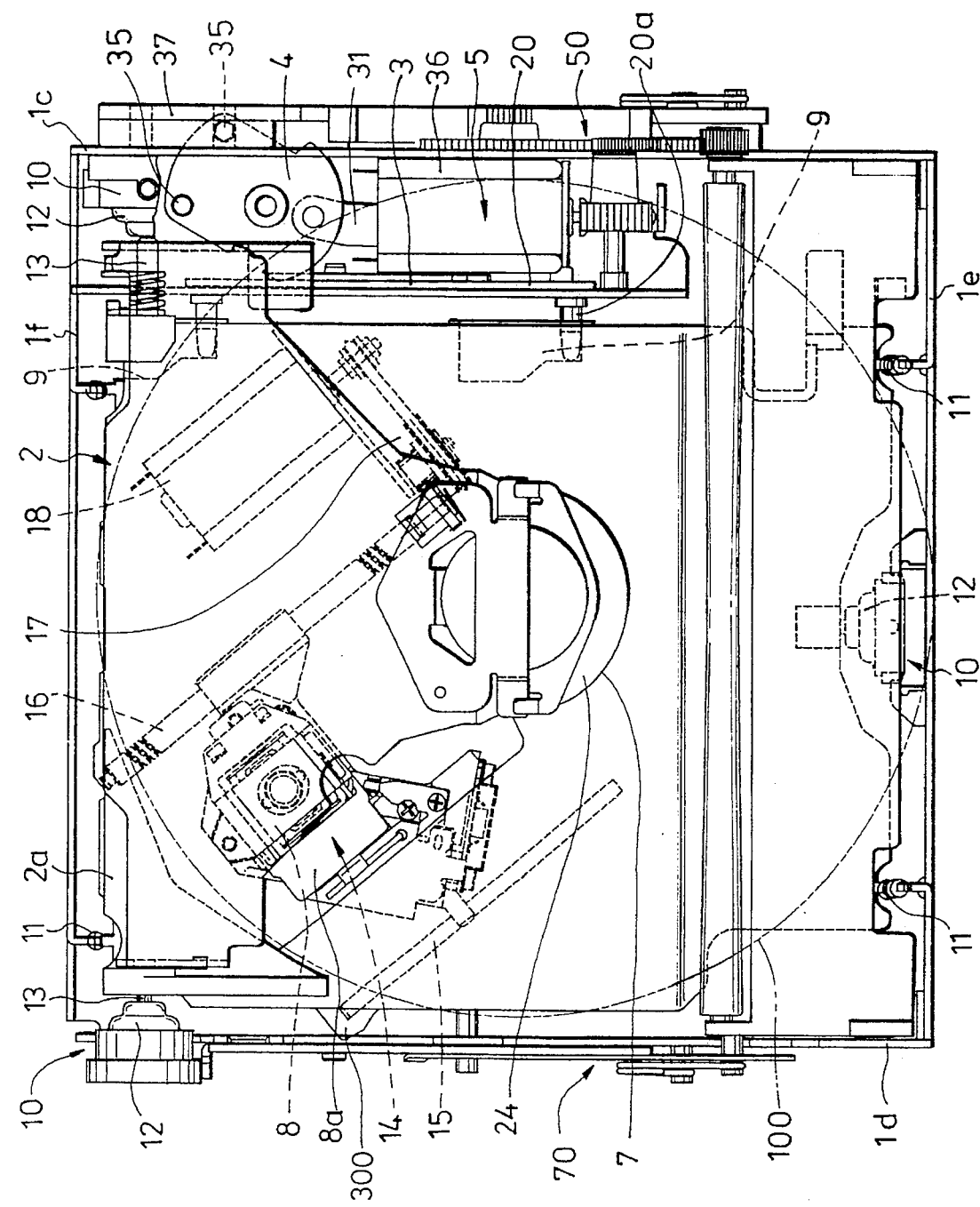
FIG. 1 is a plan view of interior units of a disc player in accordance with the present invention.
Figure 2:
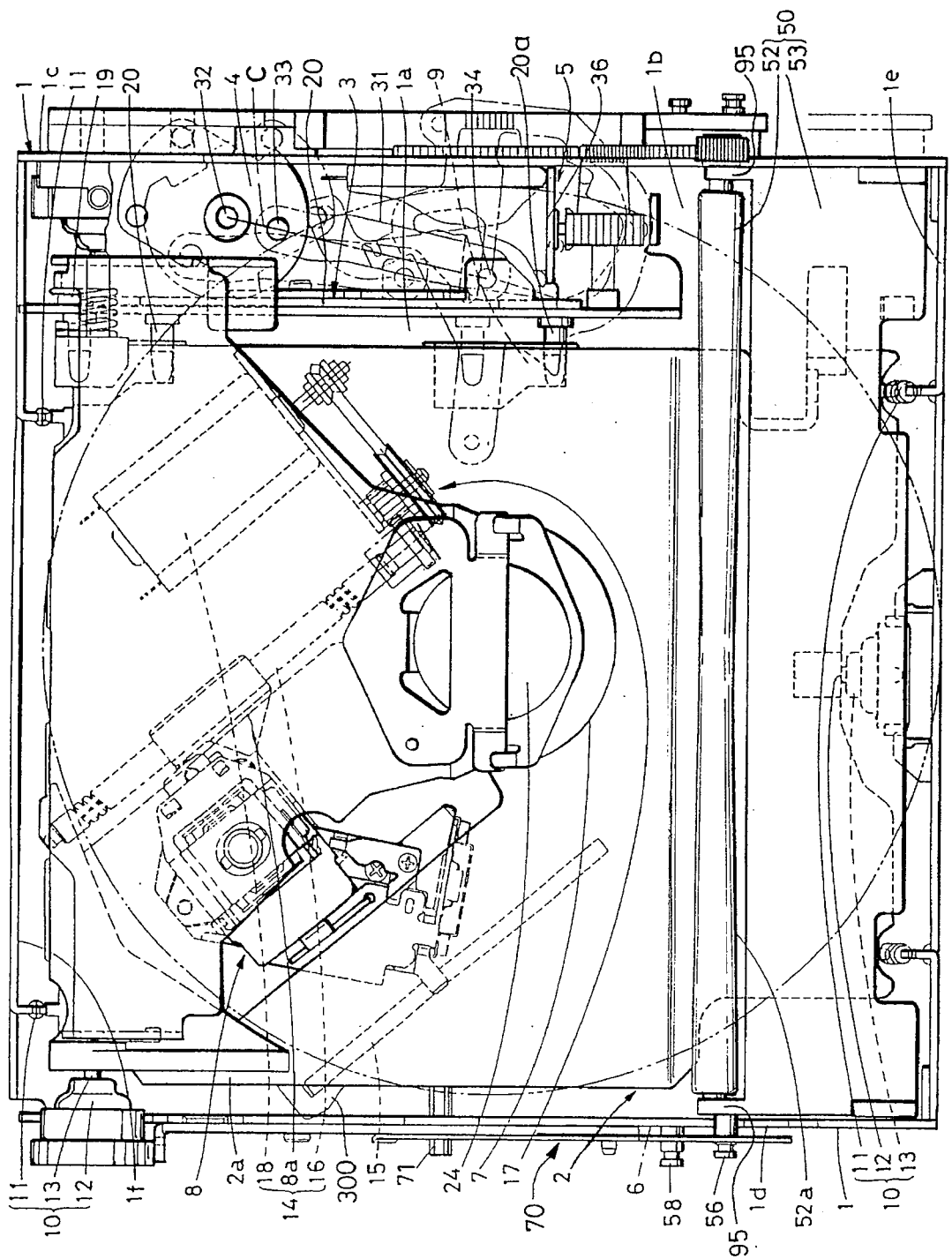
FIG. 2 is a plan view showing movements of main parts of the interior units of the disc player of FIG. 1.
Figure 3:
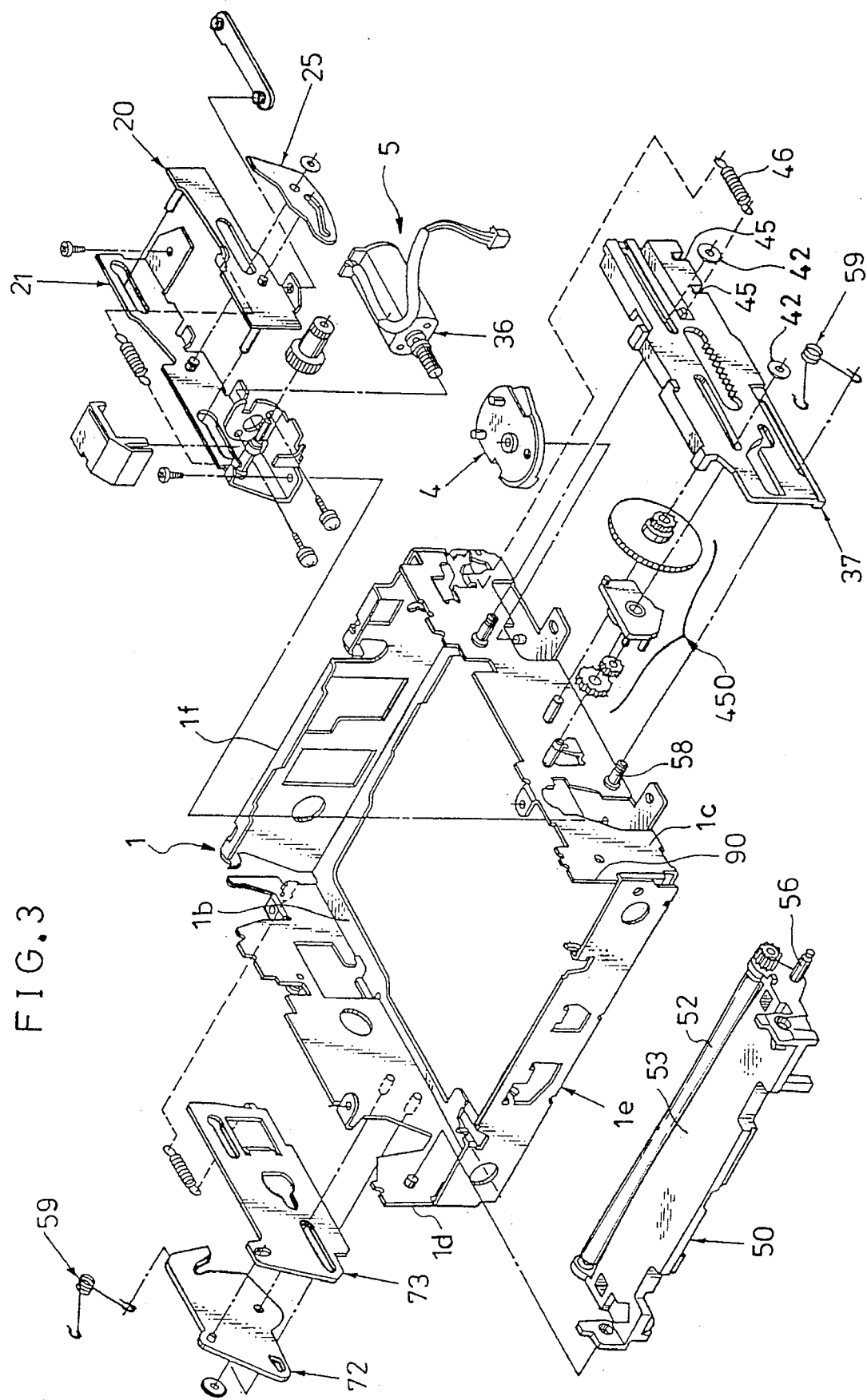
FIG. 3 is an exploded perspective view of a part of the interior units of the disc player of FIG. 1.
Figure 4:
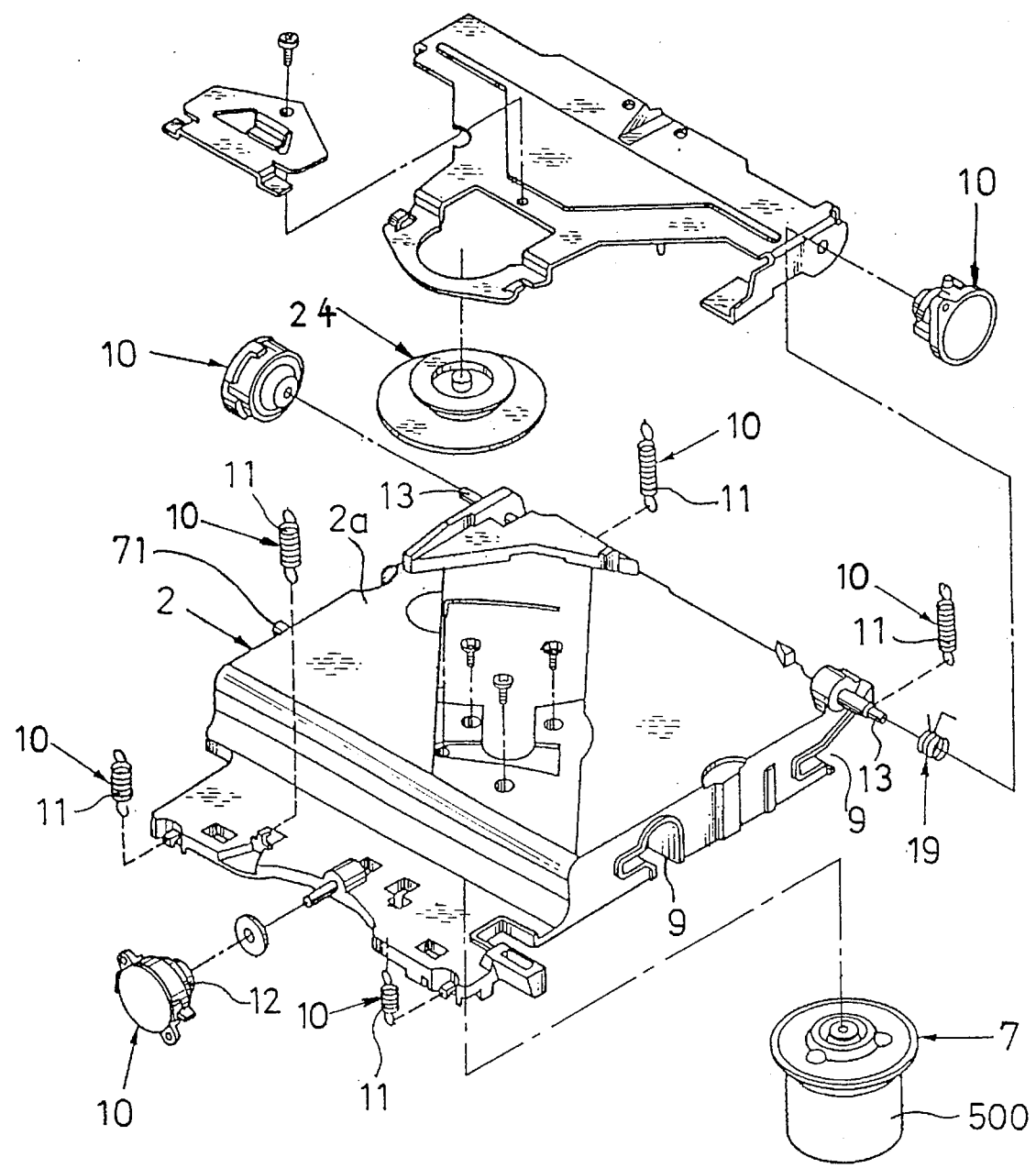
FIG. 4 is an exploded perspective view of a part of the interior units of the disc player of FIG. 1.

FIG. 1 shows a plan view of interior units of the disc player of the preferred embodiment in accordance with the present invention. FIG. 2 is a plan view showing movements of the interior units of the disc player of FIG. 1. FIG. 3 shows an exploded perspective view of a part of the interior units. FIG. 4 shows an exploded perspective view of a part of the interior units.

The disc player has a chassis 1, a floating unit 2 in the chassis 1, a locking mechanism for the floating unit 2, a disc transfer unit 50 and a disc loading unit. The disc transfer unit 50 is provided for transferring a disc inserted in the disc player toward a turntable. The disc loading unit is provided for carrying the disc into a predetermined play position on the turntable regardless of diameter, such as 8 cm CD (compact disc) or 12 cm CD, of the disc. The disc loading unit used in the disc player of the present invention is taught in the specification and drawings of the Japanese patent application Hei 6-175730, which was filed by the same inventors as the present invention.

The chassis 1, which is made of metal, is formed in a box shape. The chassis 1 has a front plate 1e, a rear plate 1f, a right-side plate 1c, a left-side plate 1d and a bottom plate 1b having an opening 1a for inspection of a printed circuit board (not shown) in the chassis 1. The circumference of the bottom plate 1b is connected continuously with the front plate 1e, the rear plate 1f, the right-side plate 1c and the left-side plate 1d through bent portions. An upper opening, which is formed by upper edges of the front plate 1e, a rear plate 1f, the right-side plate 1c and left-side plate 1d, is covered by an upper frame 6 having the disc loading unit. The front plate 1e is formed to have a predetermined height lower than of the both sides plates 1c and 1d, so as to form a slot 90 for inserting or ejecting the disc as shown in FIG. 3.

The floating unit 2 has a turntable 7 and a pickup 8, such as an optical pickup, and is swingably supported by the chassis 1 through vibration-damping units 10. The vibration-damping units 10 comprise coil springs 11 and rubber members 12. Four sets of the coil springs 11 are provided at the circumference of a floating frame 2a of the floating unit 2 so as to movably connect between the chassis 1 and the floating frame 2a. Three sets of the rubber members 12 are provided at the circumference of the floating frame 2a so as to swingably connect between pins 13 fixed to the floating frame 2a and the chassis 1 facing the pins 13. The rubber members 12 have holes for clamping the pins 13 of the floating unit 2, respectively. The floating unit 2 has two lock-pin receivers 9, 9 having concave shapes on a right-side face of the floating frame 2a as shown FIG. 1.

The turntable 7 is driven by a drive motor 500 (FIG. 4), which is disposed on a reverse face of the floating frame 2a. The pickup 8 is attached to a pickup transport unit 14, which is disposed under the reverse face of the floating frame 2a. The pickup 8 is transferred by the pickup transport unit 14 in radial direction of the turntable 7 to the peripheral part. The pickup transport unit 14 comprises a guide shaft 15, a screw rod 16 parallel with the guide shaft 15, a power transfer unit 17 having gears and a belt for rotating the screw rod 16, and a drive motor 18. A support frame 8a of the pickup 8 has a through-hole to be inserted by the guide shaft 15, and a threaded-hole to mesh with the screw rod 16. When the screw rod 16 is rotated by the drive motor 18, the pickup 8 is transferred along the guide shaft 15.

A clamper unit 24 for depressing a disc 100 on the turntable 7 is pivotally supported by the pins 13, which are supported by the rubber members 12 of the vibration-damping unit 10 at both sides of the floating unit 2. A coil spring 19 is disposed around the right side one of the pins 13 for normally urging the clamper unit 24 to depress the disc 100 on the turntable 7.

The disc player of the embodiment in accordance with the present invention has the locking mechanism, which securely holds the floating unit 2 to the chassis 1 when inserting or ejecting the disc 100, or carrying the disc player.

The locking mechanism has a lock drive unit 5, a first lock unit 3 and a second lock unit 70. The lock drive unit 5 is provided for transferring drive force of a reversible motor 36 to the first lock unit 3 and the second lock unit 70. The first lock unit 3, which is disposed on a position adjacent to the right-side plate 1c of the chassis 1, is provided to securely lock the right-hand portion of the floating unit 2 to the chassis 1 when transferring the disc 100 or carrying the disc player. The second lock unit 70, which is disposed on a position adjacent to the left-side plate 1d of the chassis 1, is provided to securely lock the left-hand portion of the floating unit 2 to the chassis 1 when transferring the disc 100 or carrying the disc player.

Operation of the Lock drive unit

Next, the lock drive unit 5 is described with reference to FIG. 5 to FIG. 7.

Figure 5:
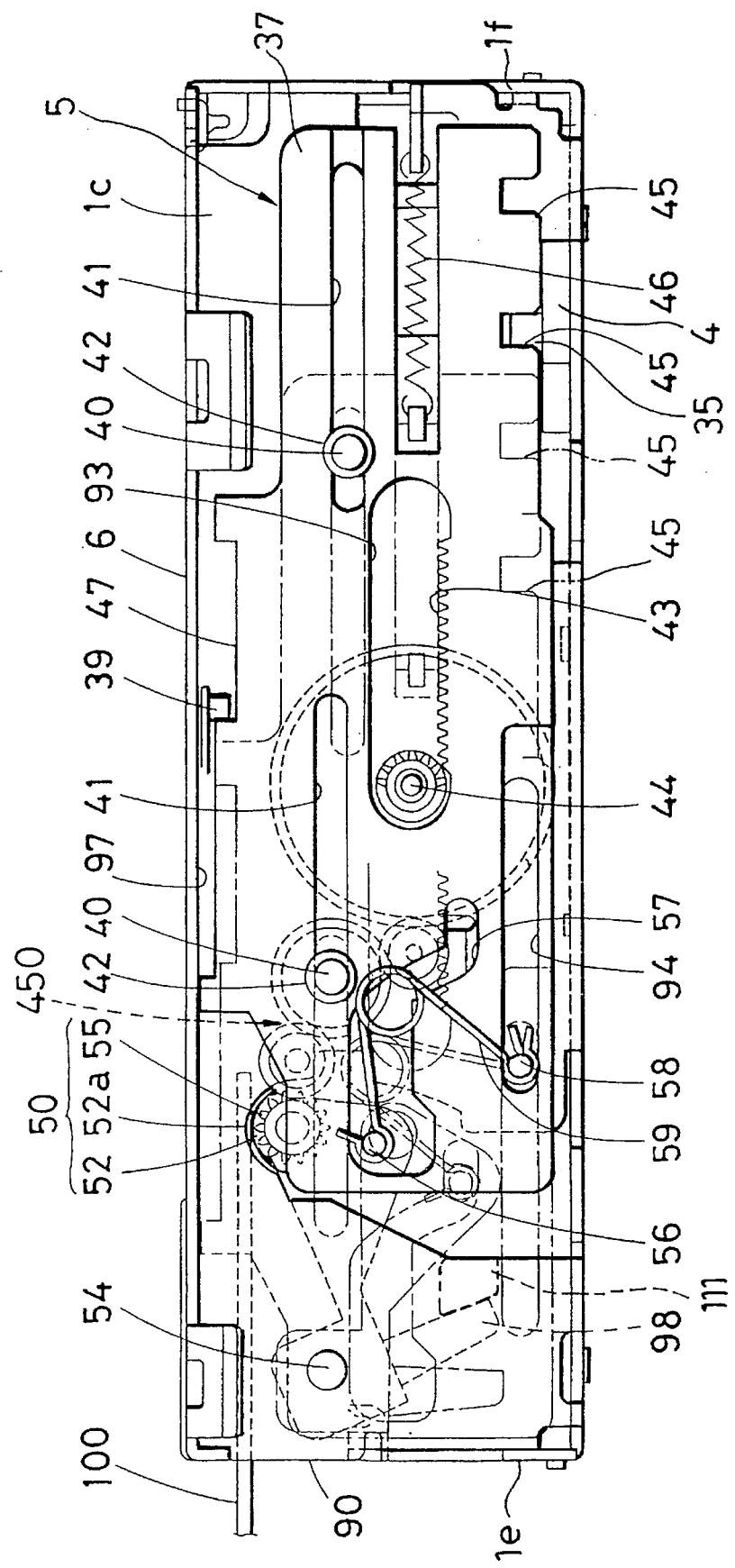
FIG. 5 is a side view showing movements of the interior units of the disc player of FIG. 1.

FIG. 5 is a right-side view showing movements of the lock drive unit 5. FIG. 6 is a right-side view showing a locking state of main components of the lock drive unit 5. FIG. 7 is a right-side view showing an unlocking state of the main components of the lock drive unit 5.

The lock drive unit 5 has the reversible motor 36 (FIG. 1) for sliding a link plate 37, which drives a rotary plate 4 linking with the first lock unit 3, and the disc transfer unit 50 linking with the second lock unit 70. The link plate 37, which is made of plastic, such as a high-impact-resistant plastic, is formed in a substantial rectangular plate shape. The link plate 37 is disposed in close to the right-side plate 1c so as to slide along with an outer face of the right-side plate 1c of the chassis 1. As shown in FIG. 5, the link plate 37 has two oval holes 41, 41, which are inserted by pins 40, 40 fixed to the right-side plate 1c, respectively. Each of the oval holes 41 have a long and narrow shape so as to smoothly slide the link plate 37 for a predetermined interval. Washer 42 is attached to the top end of the respective pins 40 for preventing the link plate 37 from coming off. Therefore, the link plate 37 is supported by the pins 40 to slide in a forward direction or a backward direction.

And the link plate 37 has an engage hole 93, which is arranged at substantial center position thereof. The engage hole 93, which is formed in oval shape, has a rack portion 43 at a part of a lower edge of the engage hole 93. The rack portion 43 is arranged to mesh with a pinion 44, which is driven by the reversible motor 36 through a gearing unit 450 with plural gears. The link plate 37 has two cam recesses 45 at the lower edge thereof. The cam recesses 45 are formed to be notched so as to engage with at least a pin 35 of the rotary plate 4.

The link plate 37 is normally urged in a backward direction by a coil spring 46 of which one end is connected to the chassis 1. The link plate 37 has a recess 47 at an upper edge thereof. The recess 47 is arranged to engage a lock-release projection 39, which is interlocked to the operation of the disc loading unit. When the disc 100 to be played is loaded by the disc loading unit 97, the lock-release projection 39 is slid for a little interval in a forward direction, so as to push the recess 47 of the link plate 37.

Figure 6:
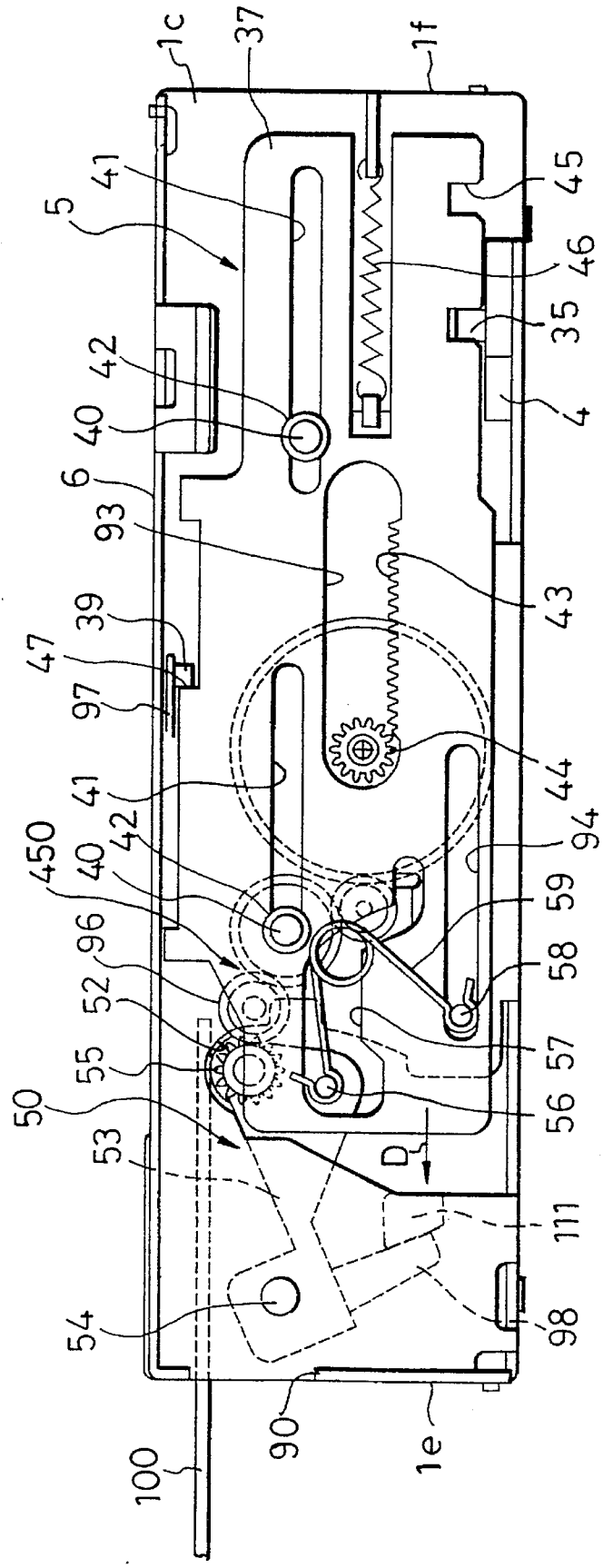
FIG. 6 is a side view showing a locking state of the interior units of FIG. 5.

When the link plate 37 is positioned at a backward position (locking state) shown in FIG. 6, the pinion 44 pivotally supported by the right-side plate 1c of the chassis 1 is idled at a front position of the engage hole 93. The pinion 44 is connected to the reversible motor 36 so as to be driven through the gearing unit 450. In the above-mentioned state that the reversible motor 36 is operated, that is, the pinion 44 is rotated by the gearing unit 450, when the recess 47 of the link plate 37 is pushed for a little interval in a forward direction (shown by an arrow D in FIG. 6) by the lock-release projection 39 interlocking to the insert operation of the disc 100, the pinion 44 meshes with the rack portion 43 of the link plate 37. As a result, the link plate 37 is transferred to a forward position (unlocking state) as shown in FIG. 7.

The disc transfer unit 50 for transferring the disc 100 toward the turntable 7 is disposed in a front portion of the chassis 1, and the disc loading unit 97 for guiding the disc 100 onto the turntable 7 is disposed under the upper chassis 6.

The disc transfer unit 50 comprises a transfer roller 52 and a roller arm 53. The transfer roller 52 transfers the inserted disc 100 by elastically contacting with the rear face of the disc 100. The transfer roller 52 is rotatably supported by support frames 95 at both sides of the roller arm 53, and is arranged parallel with the front plate 1e to contact the disc 100 by the roller arm 53 when the disc 100 is inserted or ejected. The roller arm 53 is supported by support shaft 54, which is rotatably supported by both side plates 1c and 1d of the chassis 1. The transfer roller 52 is coated by a layer made of an elastic material 52a, such as rubber, so as to produce the friction between the disc 100 and the transfer roller 52 during elastic contact. The roller arm 53 has a pair of first spring brackets 56, 56 at both sides of the roller arm 53. The projected end of one of the first spring brackets 56 is arranged inserted into a cam groove 57 of the link plate 37. A pair of second spring brackets 58, 58 corresponding to the first spring brackets 56, 56 are provided on the right and left-side plates 1c and 1d of the chassis 1. The projected end of one of the second spring brackets 58 is arranged inserted into an oblong slide hole 94 of the link plate 37. Both ends of a coil spring 59 are held by the first spring bracket 56 and the second spring bracket 58. As a result, the roller arm 53 is urged by the coil springs 59 in a direction that the rear face of the inserted disc 100 is pressed upwardly by the transfer roller 52 as shown in FIG. 6.

Since the first spring bracket 56 of the roller arm 53 engages with the cam groove 57, the first spring brackets 56 is moved along the shape of the cam groove 57 when the link plate 37 is slid in a forward direction shown by an arrow D in FIG. 6. And, the transfer roller 52 is rotated in against spring tension in a direction that the transfer roller 52 removes from the disc 100 as shown in FIG. 7.

Figure 7:
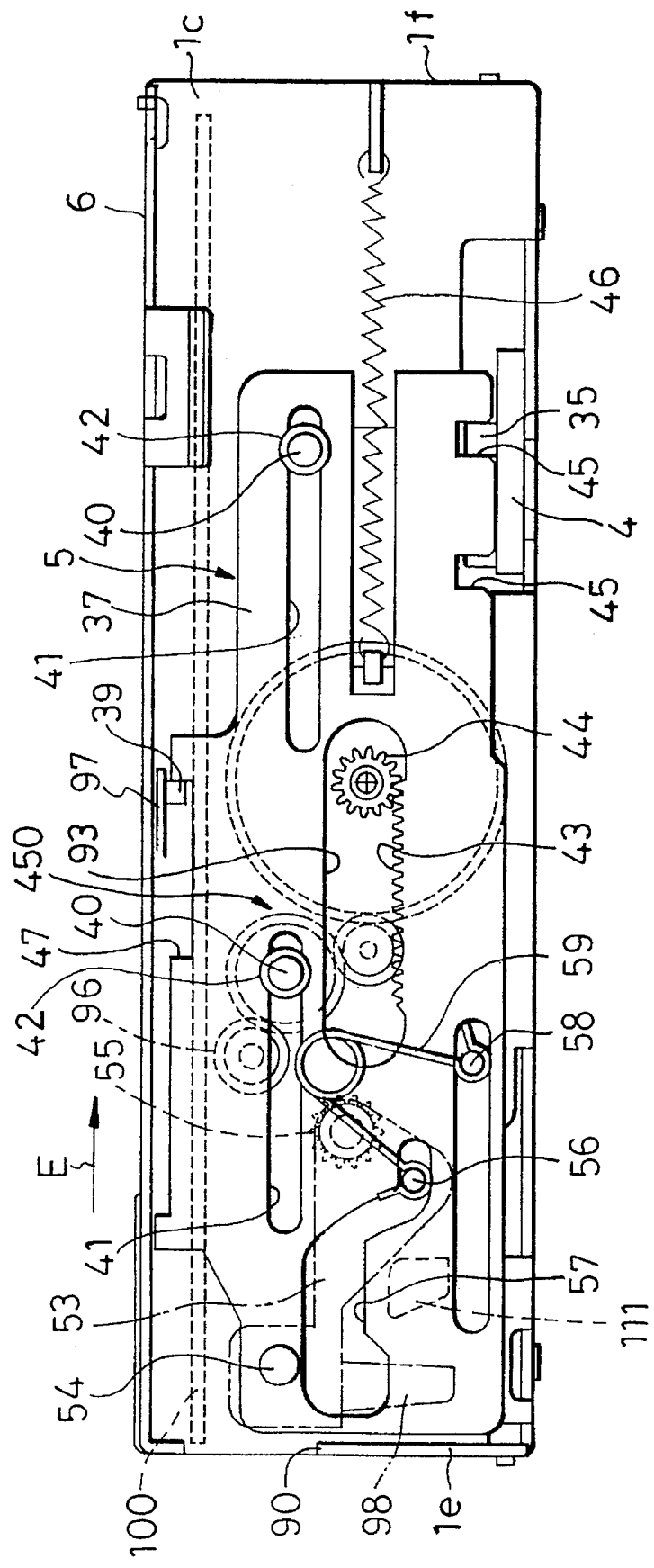
FIG. 7 is a side view showing an unlocking state of the interior units of FIG. 5.

On the other hand, when the link plate 37 is slid in a backward direction shown with arrow E in FIG. 7, the transfer roller 52 is rotated in a direction that the transfer roller 52 contacts with the inserted disc 100. The cam groove 57 has a substantially letter Z-shaped as shown in FIGS. 5 to 7, so as to conduct the above-mentioned movements of the first spring bracket 56.

The transfer roller 52 has a gear 55 at the right-side end to mesh with a gear 96 of the gearing unit 450 when the transfer roller 52 elastically contacts to the rear face of the disc 100. In the contacting between the disc 100 and transfer roller 52, the transfer roller 52 is rotated by the rotated gear 55, which is operated by the gearing unit 450 driven by the reversible motor 36. In this state, namely, the link plate 37 is at the backward position as shown in FIG. 6, the disc 100 is transferred in a backward direction or a forward direction by the rotated transfer roller 52 when the inserted disc 100 is contacted with the transfer roller 52.

The disc transfer unit 50 has an engagement member 98, which abut to a receiving member 111 fixed to the floating unit 2 when the disc 100 is transferred to the turntable 7 of the floating unit 2 as shown in FIG. 6. When the inserted disc 100 is transferred, the receiving member 111 of the floating unit 2 abuts to the engagement member 98 of the disc transfer unit 50 and thus prevents the floating unit 2 moving in a forward direction shown by an arrow D in FIG. 6. Therefore, the floating unit 2 is securely locked to the chassis 1 against the forward movement of the floating unit 2.

And, when the disc 100 is replayed in the disc player, the engagement member 98 removes from the receiving member 111 of the floating unit 2 so that the floating unit 2 is in an unlocking state.

The disc loading unit 97 for guiding the disc 100 onto the turntable 7 is disposed on the rear face of the upper chassis 6, and has the lock-release projection 39 which is interlocked to the guiding operation for the disc 100 in the disc loading unit 97. The disc loading unit 97 has plural guide pins (not shown) for guiding the disc 100 by slidably contacting with the outer peripheral edge of the disc 100. The disc 100 guided by the guide pins is accurately positioned on the turntable 7. When the guide pins of the disc loading unit 97 are moved by the insert operation of the disc 100, the lock-release projection 39 is slid for a little interval in a forward direction, and thereby the recess 47 of the link unit 37 is pressed to slide in a forward direction shown by an arrow D in FIG. 6. As a result, the link plate 37 starts to release the first lock unit 3 and the second lock unit 70 by release operations, which are explained hereinafter.

As mentioned above, the disc player of the present invention provides the lock drive unit 5, the disc transfer unit 50 and the disc loading unit 97, which are housed in the chassis 1. The disc loading unit 97 has the lock-release projection 39, which interlocks to the guide operation for the disc 100 to be played, and the sliding operation of the link plate 37 is started by the lock-release projection 39. The lock drive unit 5 has the link plate 37, which operates the rotary plate 4 and the disc transfer unit 50. When the link plate 37 is driven to slide by the engagement between the pinion 44 and the rack portion 43, the link plate 37 makes the rotary plate 4 rotate and the roller arm 53 of the disc transfer unit 50 move downwardly. The rotary plate 4 operates the first lock unit 3, and the roller arm 53 operates the second lock unit 70.

When the upper chassis 6, a microswitch (not shown) as a position sensor is provided for detecting the start of the guide operation of the guide pins when the disc 100 is inserted into the slot 90. When the microswitch detects the movement of the guide pins, the reversible motor 36 starts to operate the gearing unit 450 for driving the disc transfer unit 50, the first lock unit 3 and the second lock unit 70.

A photodiode (not shown) as a position sensor is provided in the upper chassis 6 for detecting the disc 100 accurately positioned on the turntable 7, and completely ejected from the disc player. When the photodiode detects the disc 100 on the turntable 7, the reversible motor 36 is stopped thereby stopping the gearing unit 450.

When the photodiode detects the disc 100 ejected from the disc player, the reversible motor 36 comes to a stop also.

Locking and Unlocking operations of the First lock unit

Figure 8:
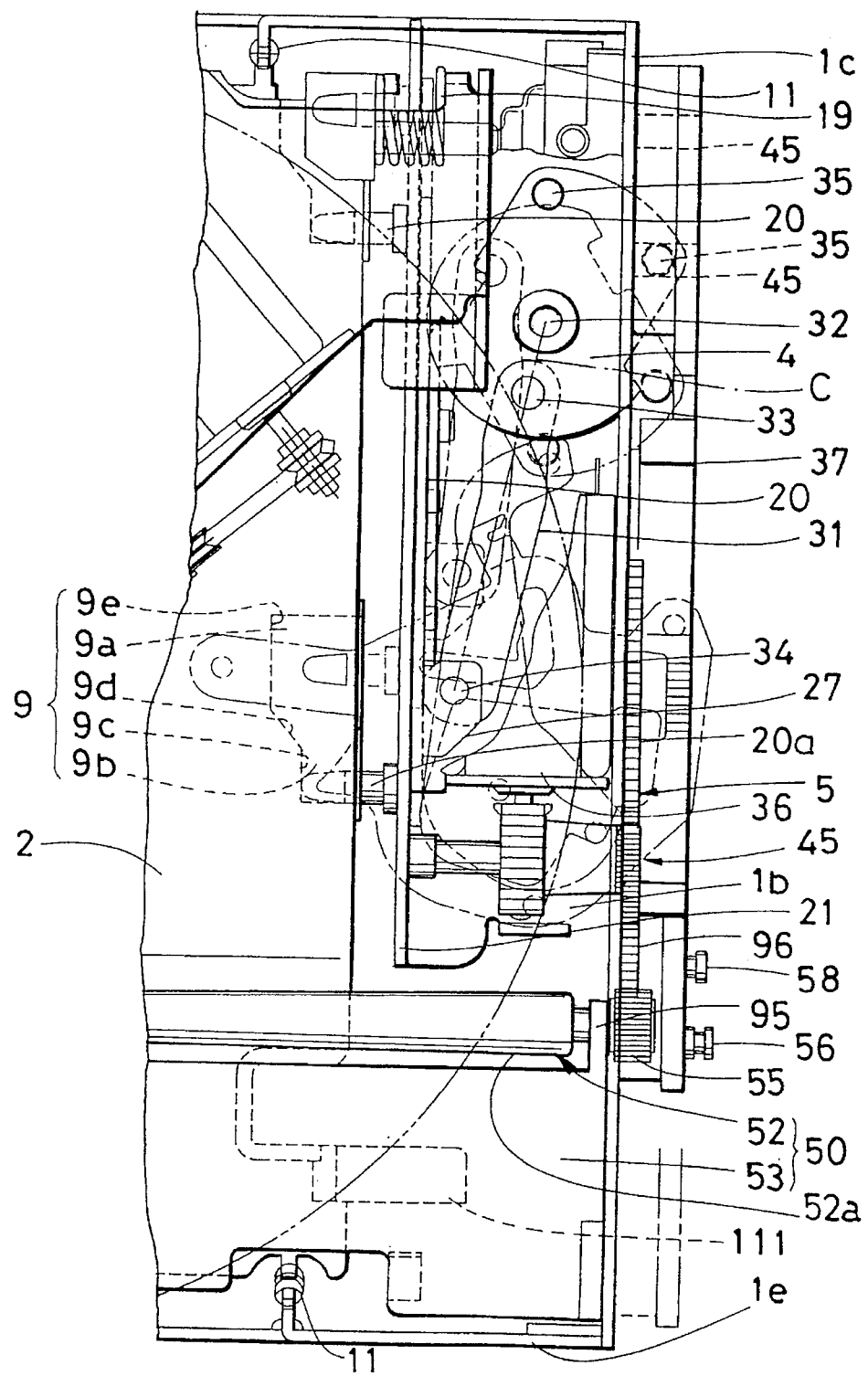
FIG. 8 is a plan view showing movements of the interior units of the disc player of FIG. 1.
Figure 9:
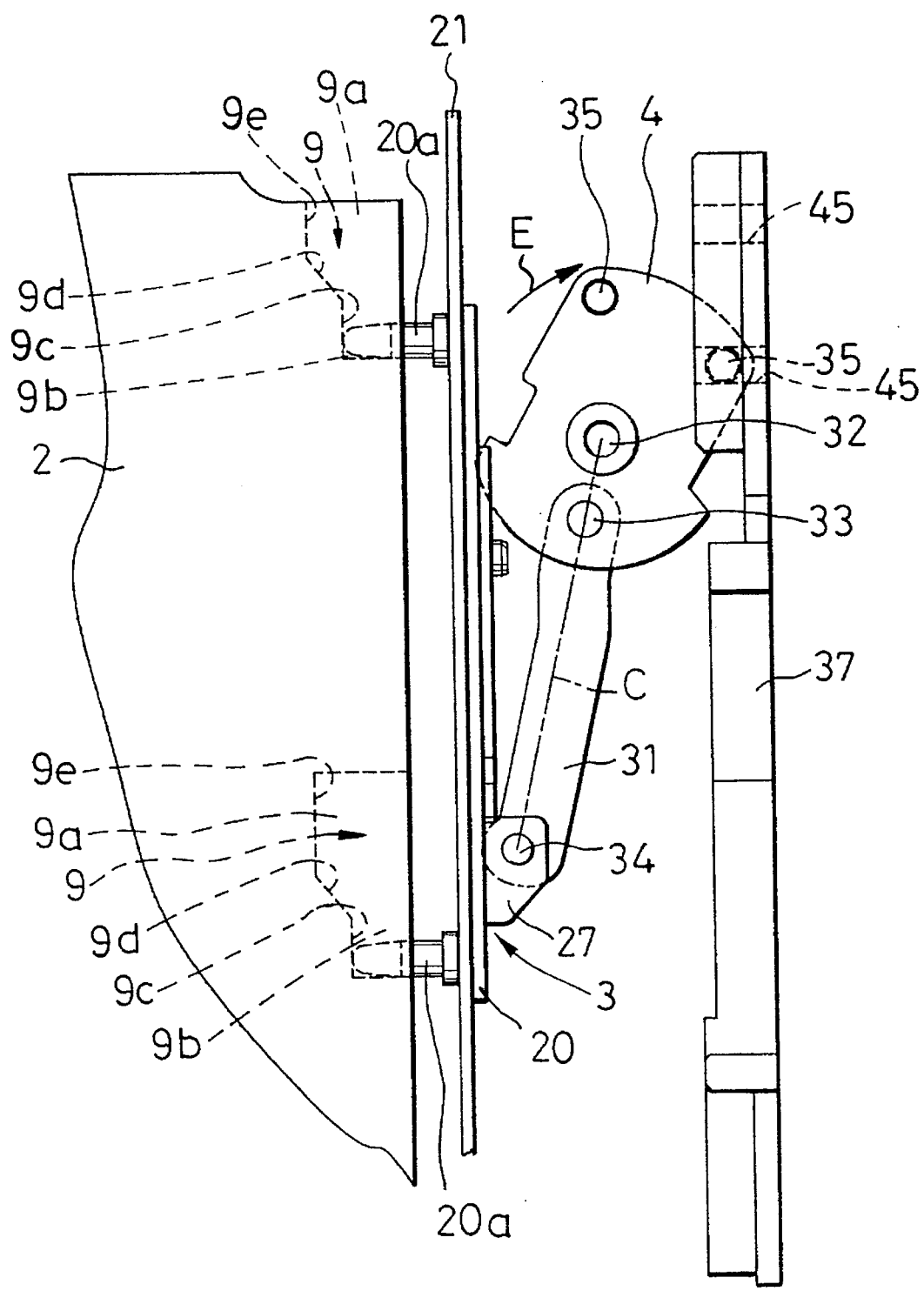
FIG. 9 is a plan view showing a locking state of the interior units of FIG. 8.
Figure 10:
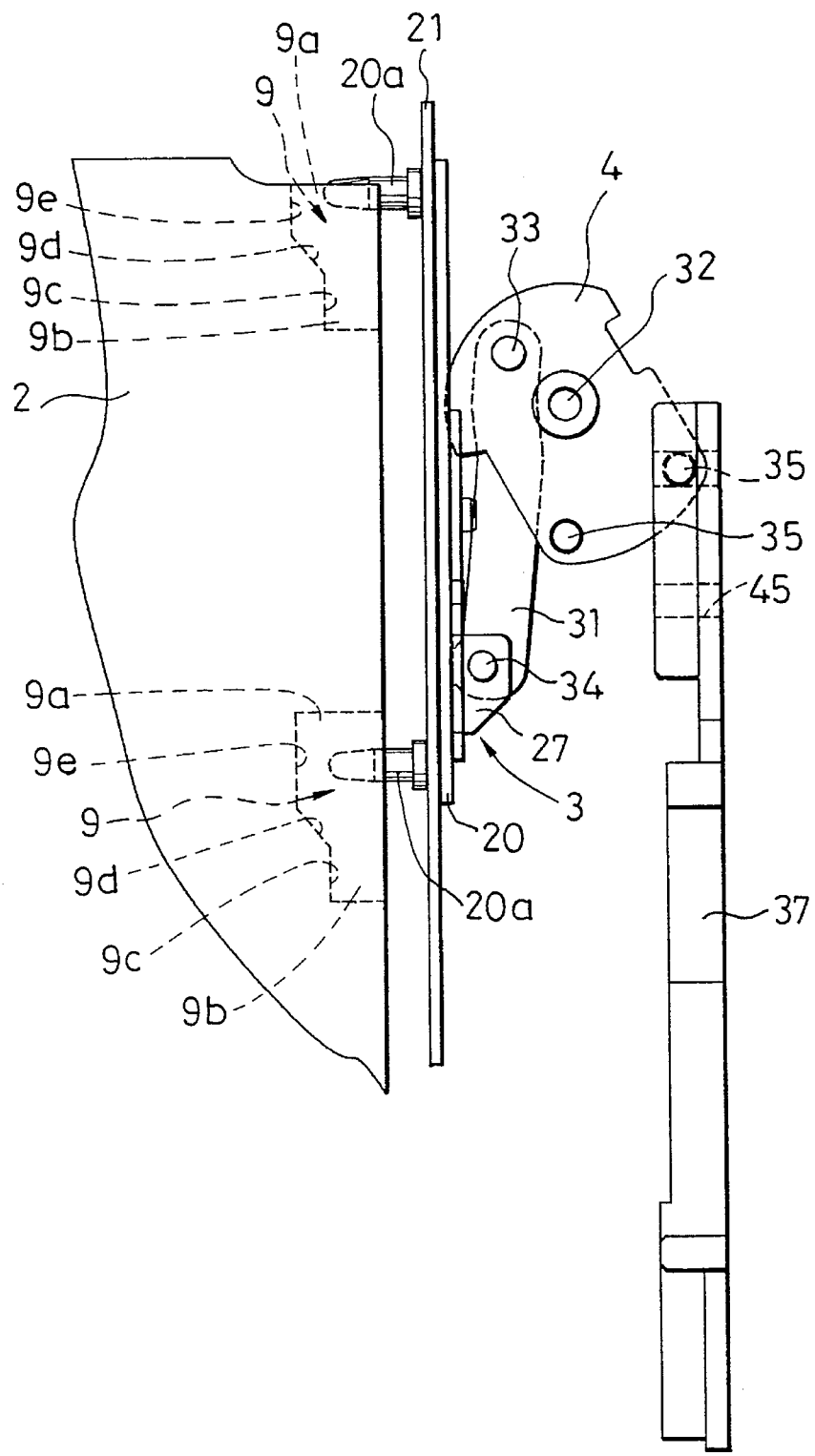
FIG. 10 is a plan view showing an unlocking state of the interior units of FIG. 8.

Next, the locking and unlocking operations of the first lock unit 3 are described with reference to FIGS. 8 to 13. The first lock unit 3 is for locking a first (right) side of the floating unit 2 by slidingly moving of lock pins 20a to narrow and shallow portions 9b of the lock pin receivers 9. FIG. 8 is a plan view showing movements in the left-side portion of the interior units of the disc player of this embodiment. FIG. 9 is a plan view showing a locking state of main components of the first lock unit 3 and the like. FIG. 10 is a plan view showing an unlocking state of the main components of FIG. 9.

The first lock unit 3 has a lock plate 20, which is disposed at a position adjacent to the right face of the floating unit 2. The lock plate 20 is provided to slide in a forward direction or a backward direction by the rotary plate 4 through the connecting arm 31. The link plate 37 and the lock plate 20 are slid in parallel but opposite directions by means of the rotary plate 4 and the connecting arm 31. In other words, when the link plate 37 is positioned at the forward position, the lock plate 20 is position at the backward position, and when the link plate 37 is positioned at the backward position, the lock plate 20 is positioned at the forward position.

In a sliding operation of the link plate 37 in a backward direction from the forward position, the rotary plate 4 is rotated by at least one of projections 35 on the rotary plate 4 because at least one of the projections 35 engages with the cam recess 45 of the link plate 37, and thereby the lock plate 20 is slid in a forward direction by the connecting arm 31.

When the link plate 37 is slid in a forward direction from the backward position, the rotary plate 4 is rotated in a clockwise direction shown by an arrow E in FIG. 9, and thereby the lock plate 20 is slid in a backward direction. The lock plate 20 has two lock pins 20a, 20a for engaging the lock-pin receivers 9, 9 of the floating unit 2. Each of the lock-pin receivers 9 is formed to have a narrow and shallow portion 9b at forward side thereof, and a wide and deep portion 9a at backward side. As shown in FIG. 9, when the lock plate 20 is positioned at a forward position, the lock pins 20a are inserted into the narrow and shallow portions 9b of the lock-pin receivers 9, respectively. As a result, the floating unit 2 is in the locking state. On the other hand, when the lock plate 20 is positioned at a backward position, the lock pins 20a are free from the lock-pin receivers 9 as shown in FIG. 10, respectively. As a result, the floating unit 2 is in an unlocking state.

Figure 11:
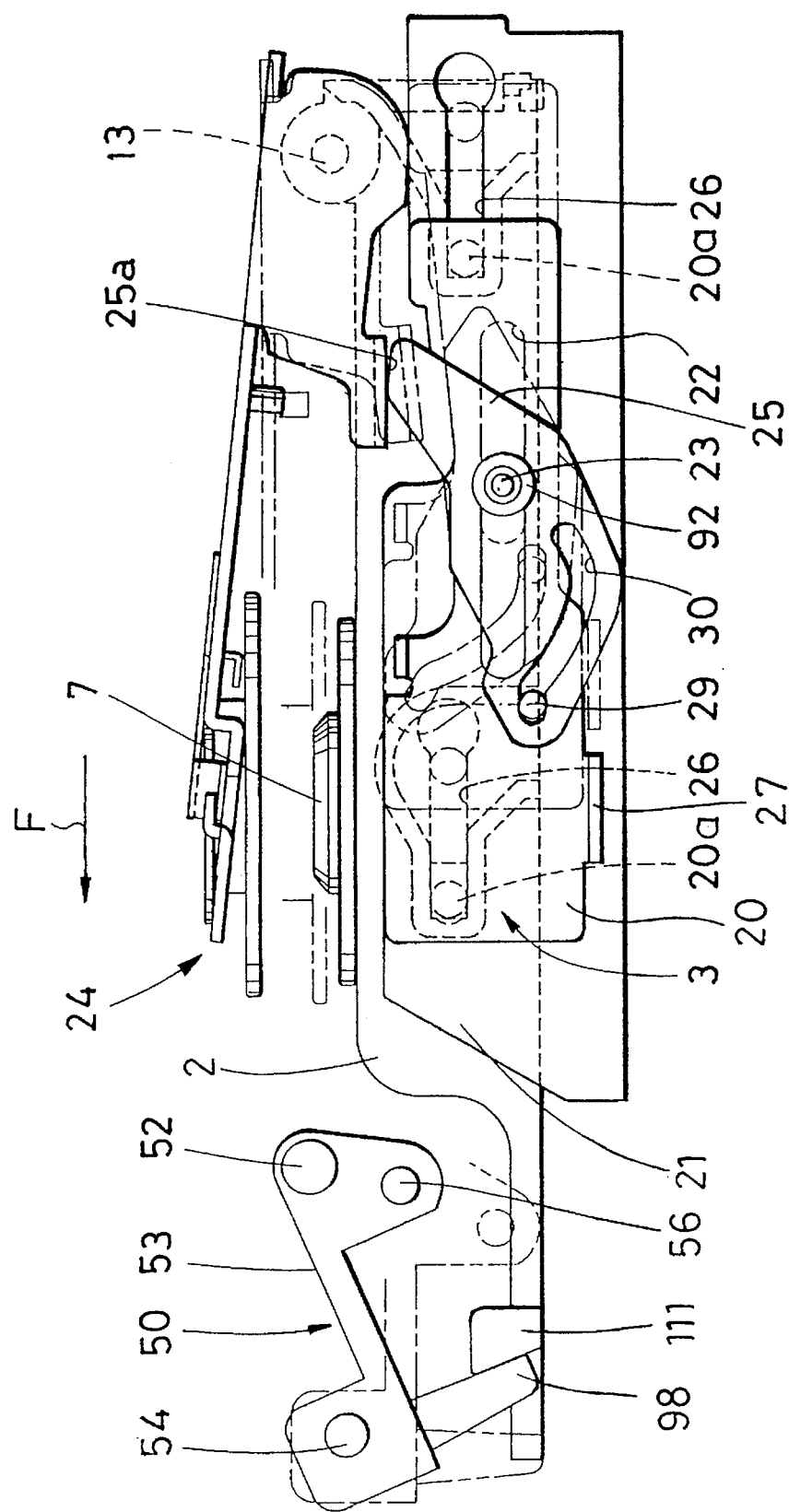
FIG. 11 is a right-side view showing movements of the interior units of the disc player of FIG. 1.
Figure 12:
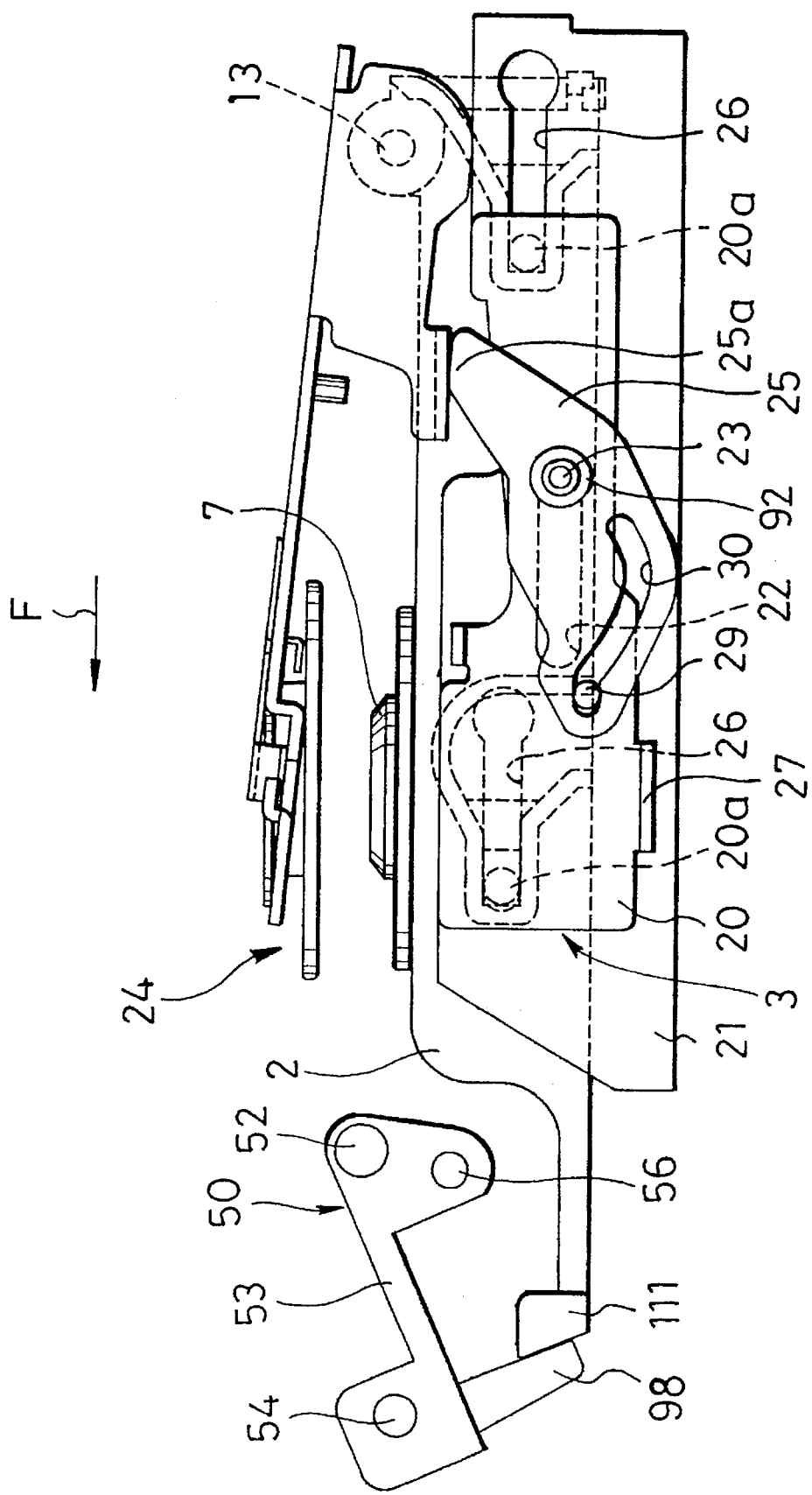
FIG. 12 is a right-side view showing a locking state of the interior units of FIG. 11.
Figure 13:
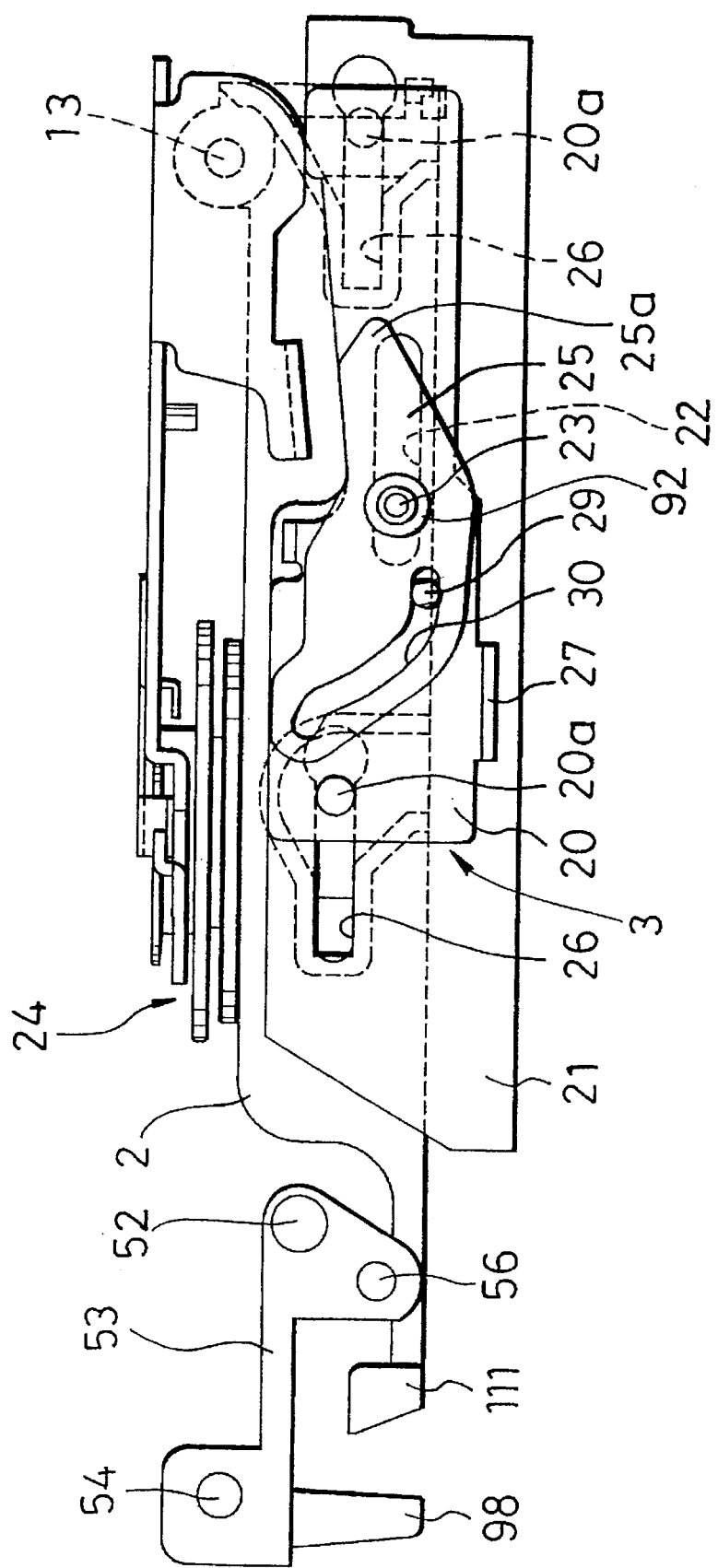
FIG. 13 is a right-side view showing an unlocking state of the interior units of FIG. 11.

The lock plate 20, which is formed to have a substantially rectangular shape, is arranged parallel with the right sideface of the floating frame 2a of the floating unit 2. The lock plate 20 is supported by a guide plate 21, which is fixed to the bottom plate 1b by tightening bolts (not shown). The lock plate 20 is disposed to contact the opposite face of the guide plate 21 against the floating unit 2, and slidably connected to the guide plate 21 by engagement between an oblong sliding hole 22 of the lock plate 20 and a shaft 23 fixed to the guide plate 21 as shown in FIGS. 11 to 13. FIG. 11 is a side view showing movements of the lock plate 20, the disc transfer unit 50 and the clamper unit 24. FIG. 12 is a side view showing the locking state of these units of FIG. 11. FIG. 13 is a side view showing the unlocking state of these units of FIG. 11. The lock pins 20a of the lock plate 20 are inserted into the lock-pin receivers 9 through an oblong hole 26 of the guide plate 21. And, the lock plate 20 has a bracket 27 at a lower edge thereof. The bracket 27 has a hole for connecting the connecting arm 31.

As shown in FIG. 11, a lift lever 25 for lifting the clamper unit 24 is pivotally supported by the shaft 23 fixed to the guide plate 21. Therefore, the lift lever 25 and the lock plate 20 are disposed to overlap each other, and movably supported by the shaft 23 with a washer 92 for preventing from coming off. The lift lever 25 has a cam groove 30 for engaging a cam projection 29 of the lock plate 20. When the lock plate 20 is slid in a forward direction shown by an arrow F in FIG. 11, the lift lever 25 is rotated by the cam projection 29, and thereby an end member 25a of the lift lever 25 lifts the clamper unit 24 against spring tension of the coil spring 19 as shown in FIG. 12. In this state shown in FIG. 12, the disc 100 can be loaded or unloaded on the turntable 7 in the disc player.

The lock pin 20a of the lock plate 20 has a tapered top and a rounded tip as shown in FIGS. 8 to 10. And, the lock-pin receiver 9 to be inserted by the lock pin 20a is formed in a following configuration.

The lock-pin receiver 9 has the wide and deep portion 9a where the lock pin 20a is positioned in the unlocking state, and the narrow and shallow portion 9b where the lock pin 20a is inserted so as to make the floating unit 2 lock. When the lock pin 20a is inserted closely into the narrow and shallow portion 9b, a back face 9c of the narrow and shallow portion 9b is arranged to contact the top end of the lock pin 20a as shown in FIG. 9.

In the unlocking state shown in FIG. 10, a back face 9e of the wide and deep portion 9a is arranged apart from the top end of the lock pin 20a. These back faces 9c and 9e of the lock-pin receiver 9 are continuously connected by a slant face 9d. Since the lock pin 20a has a tapered top and a rounded tip, the lock pin 20a do work so as not to contact the wide and deep portion 9a of the lock-pin receiver 9 in the floating state of the floating unit 2 but to smoothly and easily move into the narrow and shallow portion 9b to make the floating unit 2 lock. Thereby the reliabilities of the locking and unlocking operations are increased.

Since the top end of the lock pin 20a is contacted to the back face 9c of the lock-pin receiver 9 in the locking state, the floating unit 2 is locked against laterally movement or shock in a rightward direction.

And, since the lock pin 20a has a rounded tip, and the lock-pin receiver 9 has the slant back face 9d, the lock pin 20a can be smoothly transferred in the lock-pin receiver 9.

The rotary plate 4, which is connected to the lock plate 20 of the first lock unit 3 through the connecting arm 31, is pivotally supported by a rotary shaft 32, which is formed by striking out the bottom plate 1b of the chassis 1 to project from rear face thereof. The lock plate 20 is slid to a forward position or a backward position by reversible movement of the rotary plate 4. The rotary plate 4 made of plastic is formed in a substantially disc shape having a partial cutout as shown in FIGS. 8 to 10. And the rotary plate 4 has a connecting portion 33 for connecting the connecting arm 31. The connecting portion 33 is provided on the periphery of the rotary plate 4, and is connected to the connecting portion 34 of the bracket 27 of the lock plate 20 by the connecting arm 31. A pair of the projections 35, 35 and the connecting portion 33 are arranged on opposite positions of the rotary plate 4 against the rotary shaft 32 of the rotary plate 4.

In the locking state, wherein the lock plate 20 is positioned at the forward position as shown in FIG. 9, the rotary shaft 32 of the rotary plate 4 is arranged to intersect at right angles to a virtual line C established between a center of the connecting portion 33 and a center of the connecting portion 34 for the lock plate 20. To meet the above-mentioned arrangements, the relative position between the rotary plate 4 and the lock plate 20 are designed in the chassis 1.

Accordingly, since the rotary shaft 32 of the rotary plate 4 is positioned at the virtual line C established between the connection portions 33 and 34 in the locking state, if the locked floating unit 2 receives impactive force in a backward direction, the impactive force is applied toward a center of the rotary shaft 32 of the rotary plate 4 through the link plate 20 and the connecting arm 31. However, the impactive force is not converted into the force for rotating the rotary shaft 32 of the rotary plate 4. Accordingly, the disc player of the embodiment in accordance with the present invention prevents the lock drive unit 5 from receiving such impactive forces in the locking state, and from catching in the engagement portions by using the above-mentioned simple mechanism and the arrangements.

Locking and Unlocking operations of the Second lock unit

Figure 14:
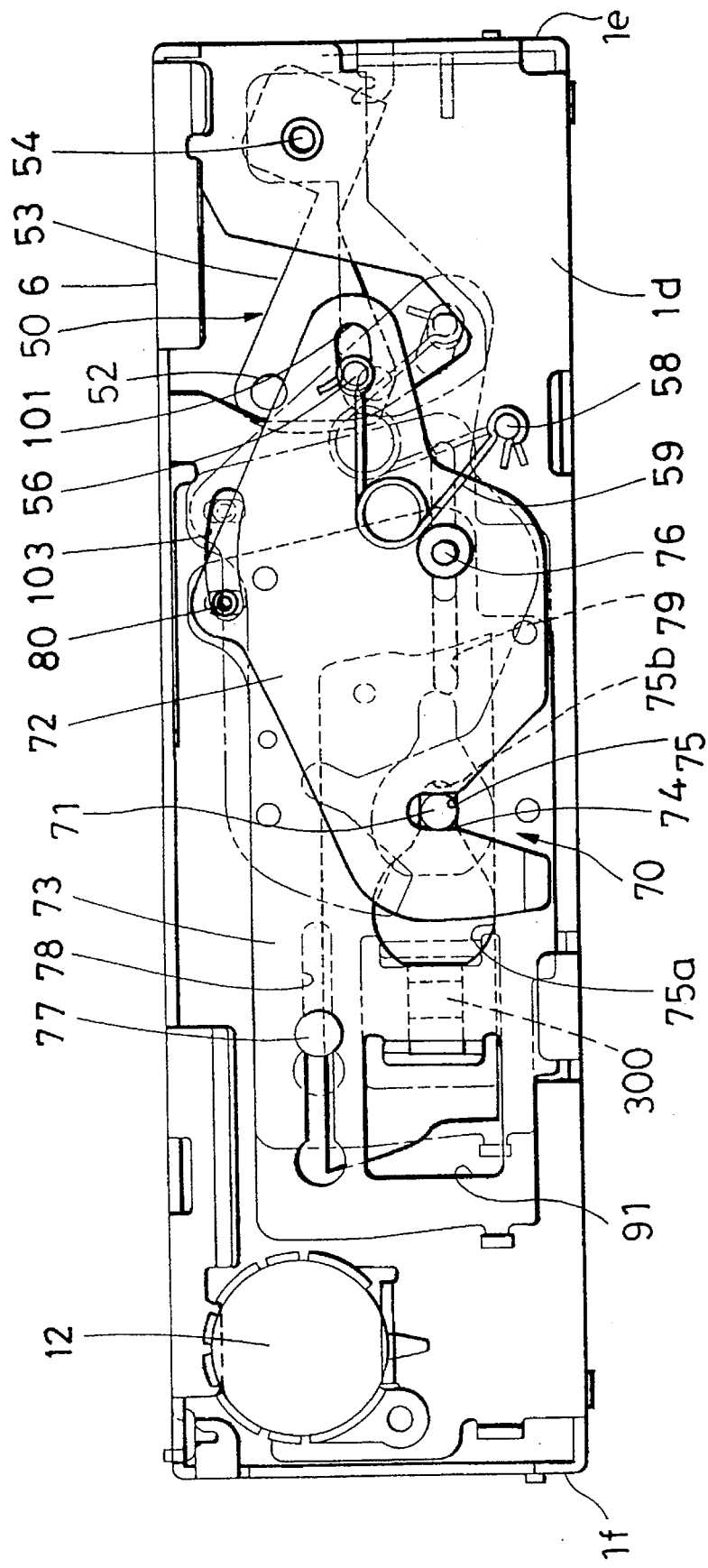
FIG. 14 is a left-side view showing movements of the interior units of the disc player of FIG. 1.
Figure 15:
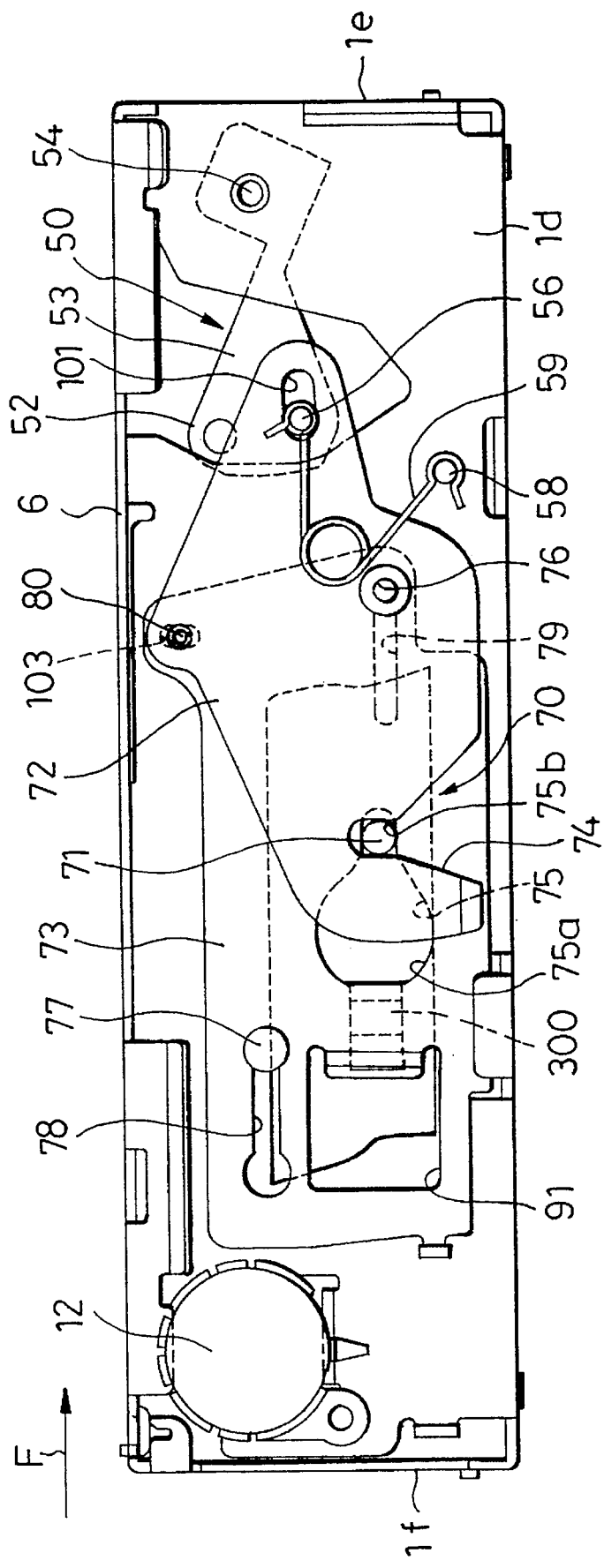
FIG. 15 is a left-side view showing a locking state of the interior units of FIG. 14.
Figure 16:
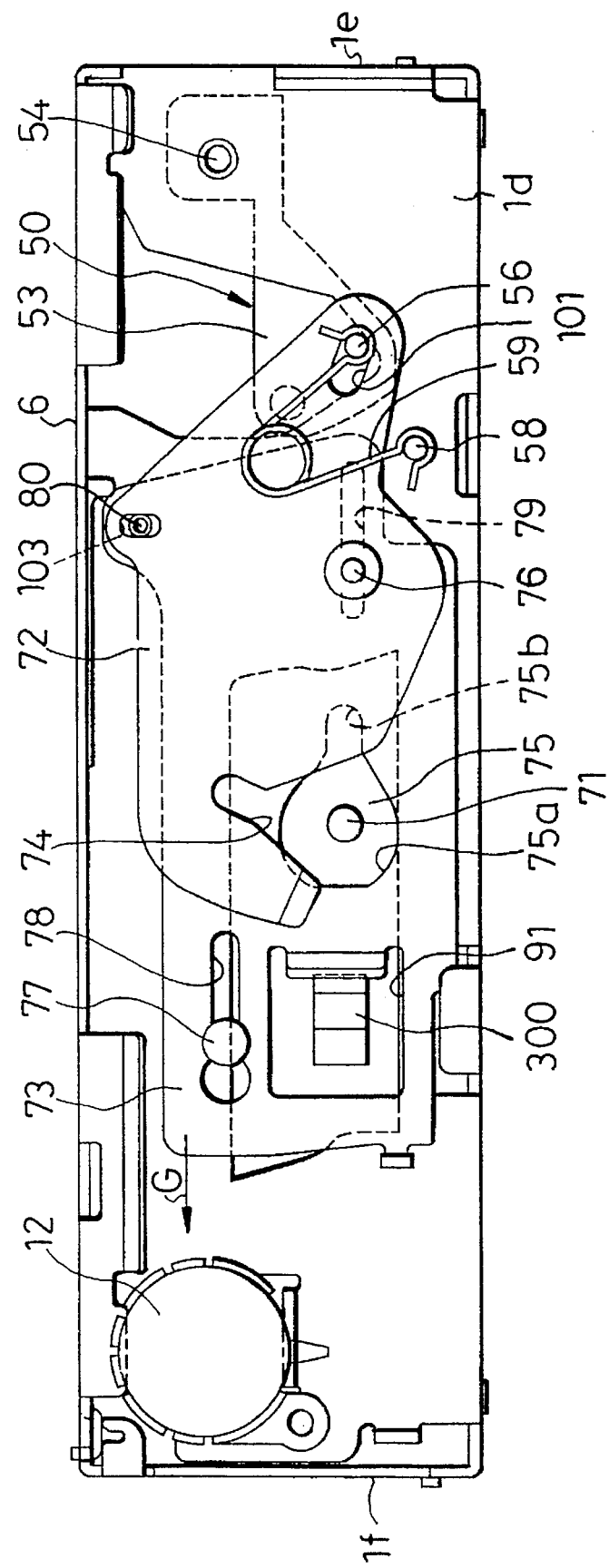
FIG. 16 is a left-side view showing an unlocking state of the interior units FIG. 14.
Figure 17:
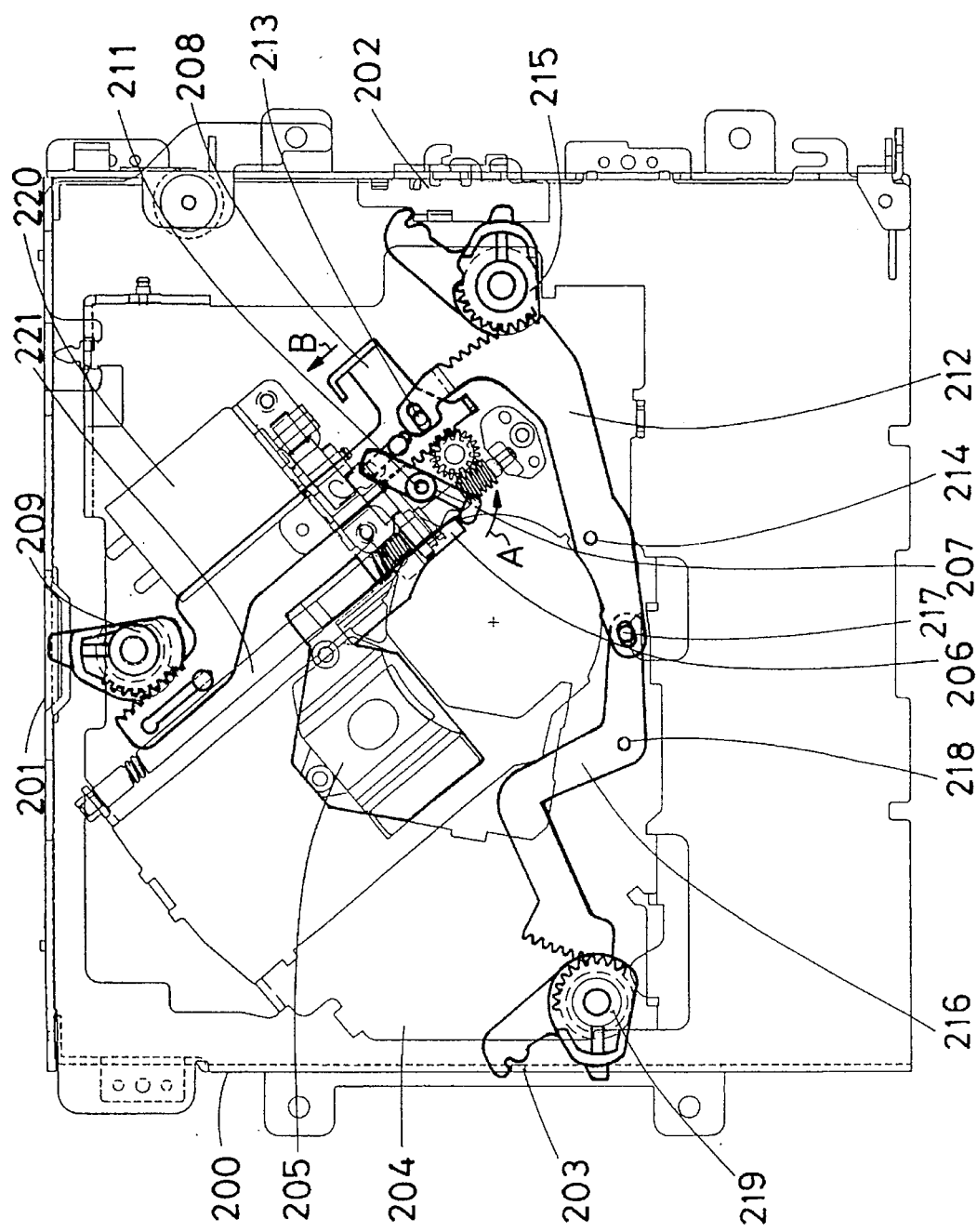
FIG. 17 is the plan view showing the interior units of the conventional disc player.

Next, the locking and unlocking operations of the second lock unit 70 are described with reference to FIGS. 14 to 16. The second lock unit 70 is for locking a second (left) side of the floating unit 2 by pinching a locking projection 71, by cooperative sliding and rotating motions of the first lock plate 72 with a notch or recess 74 and a second lock plate 73 with a hole. FIG. 14 shows a left-side view of the second lock unit 70 disposed close to the outer face of the left-side plate 1d of the chassis 1. FIG. 15 is a left-side view showing the locking state of main components of the second lock unit 70 and the like. FIG. 16 is a left side view showing the unlocking state of the main components of FIG. 15.

The floating unit 2, of which the right-side face has the aforementioned lock-pin receivers 9, has a locking projection 71 on the left-side face thereof. The second lock unit 70 comprises a first locking member 72 and a second locking member 73, which are attached to the left-side plate 1d facing the locking projection 71 of the floating unit 2 as shown in FIGS. 14 to 16. The first locking member 72 and the second locking member 73, which are interlocked to the movement of the disc transfer unit 50, have a first recess 74 and a second recess 75, respectively. The first recess 74 of the first locking member 72 and the second recess 75 of the second locking member 73 engage with the locking projection 71 to cross each other in the locking state.

The first locking member 72 is rotatably supported by a shaft 76 fixed to the left-side plate 1d of the chassis 1. As shown in FIG. 15, the first recess 74 is formed to have a vertical slot, and to be widened at lower side of the first locking member 72. The first locking member 72 has an oval hole 101, which is inserted by the first spring bracket 56 fixed to the roller arm 53 of the disc transfer unit 50. The oval hole 101 is formed to extend in a horizontal direction at the locking state. When the transfer roller 52 of the disc transfer unit 50 is positioned to elastically contact the inserted disc 100, in other words, the floating unit 2 is in the locking state by means that the link plate 37 is positioned at the backward position (shown in FIG. 6) and the lock plate 20 is positioned at the forward position (shown in FIG. 9 and FIG. 12), the locking projection 71 engages with the first recess 74 of the first locking member 72 as shown FIG. 15.

On the other hand, when the transfer roller 52 is rotated to remove from the inserted disc 100, the first locking member 72 is moved in an upward direction by the rotation of the first spring bracket 56 sliding in the oblong hole 101, and thereby the first recess 74 of the first locking member 72 removes from the locking projection 71 of the floating unit 2 as shown in FIG. 16.

The second locking member 73 is disposed between the first locking member 72 and the left-side plate 1d of the chassis 1. The second locking member 73 has a first oval hole 79 for slidably engaging with the shaft 76 fixed to the left-side plate 1d, and has a second oval hole 78 for slidably engaging with a pin 77 fixed to the left-side plate 1d. A top end of the pin 77 is formed to have a large diameter for preventing the second locking member 73 from coming off. Therefore, the second locking member 73 is slidably supported by the shaft 76 and the pin 77 parallel with the left-side plate 1d of the chassis 1. The second recess 75 of the second locking member 73 is formed to have a big hole portion 75a and a small hole portion 75b continuously and laterally connected to the big hole 75a as shown in FIGS. 14 to 16. The locking projection 71 of the floating unit 2 is arranged in the second recess 75 of the second locking member 73. The second locking member 73 is connected to the first locking member 72 by movably engagement between a connecting pin 80 of the first locking member 72 and an oval-shape hole 103 of the second locking member 73.

Therefore, when the first recess 74 of the first locking member 72 engages with the locking projection 71, the second recess 75 of the second locking member 72 engages with the locking projection 71 as shown in FIG. 15. As a result, the left side portion of the floating unit 2 is locked against a forward, a backward, an upward and a downward movement.

The rightward movement in the side-to-side motions against the floating unit 2 is locked by abutting of the back face 9c of the narrow and shallow portion 9b to the lock pins 20a as shown in FIG. 9. And a leftward movement of the side-to-side motions is locked by abutting of the second locking member 73 to a projection 300 provided on the left-side face of the floating unit 2 as shown in FIG. 14.

When the first recess 74 removes from the locking projection 71 by the rotation of the first locking member 72, the second locking member 73 is slid in a forward direction shown by an arrow F in FIG. 15. Therefore, the locking projection 71 is positioned in the big hole portion 75a of the second recess 75 as shown in FIG. 16. As a result, the floating unit 2 is swingably supported by the vibration-damping units 10 only, namely in the unlocking state. In the unlocking state, the projection 300 of the floating unit 2 is positioned in a big rectangular hole 91 of the second locking member 73 as shown in FIG. 16.

As mentioned above, the disc player of the embodiment in accordance with the present invention has the floating unit 2, which can be locked by the first lock unit 3 having the lock-pin receiver 9 and the like, and the second lock unit 70 having the locking projection 71 to engage with the recesses 74, 75 of the locking members 72, 73. Therefore, the floating unit 2 can be surely locked by the locking operation of the above-mentioned locking mechanism.

Operation for inserting and ejecting the disc

Operation of the above-mentioned disc player in accordance with the present invention is described hereafter.

If unlocked floating unit receives impactive force before the disc is loaded in the disc player, the vibration-damping units 10 and the disc transfer unit 50 etc. are in danger of breaking. In order to prevent such fracture caused by the impactive force, the floating unit 2 must be locked before unloading. In the unloading state, wherein the disc 100 is not inserted in the disc player, the lock-pin receiver 9 of the floating unit 2 is secured by the lock pin 20a of the lock plate 20. In this unloading state, the lock plate 20 is positioned at the forward position, and the link plate 37 is positioned at the backward position as shown in FIG. 9. And the transfer roller 52 of the roller arm 53 is arranged to elastically contact the disc 100 as shown in FIG. 6. At the same time, the gear 55 of the transfer roller 52 meshes with the gearing unit 450, and the engagement member 98 of the roller arm 53 is abutted to the receiving member 111 of the floating unit 2. Thus the floating unit 2 is prevented from moving in the forward direction (shown by an arrow D in FIG. 6).

And further, as shown in FIG. 15, the locking projection 71 of the floating unit 2 engages with the first recess 74 of the first locking member 72 and the second recess 75 of the second locking member 73, thereby locking the floating unit 2 against the forward, the backward, the upward and the downward movements of the floating units 2. As mentioned above, the floating unit 2 of the disc player is prevented from swinging in the unloading state.

As shown in FIG. 12, when the lock plate 20 is positioned at the forward position, the clamper unit 24 is lifted by the end member 25a of the lift lever 25, and thereby the disc player is in a standby state.

In the above-mentioned standby state, when the disc 100 is inserted into the slot 90 as shown in FIG. 6, the guide pins of the disc loading unit 97 are slid along the outer peripheral edge of the disc 100. When the microswitch as a proximity sensor detects the movement of the guide pins of the disc loading unit 97, the reversible motor 36 of the lock drive unit 5 is rotated, and the transfer roller 52 of the disc transfer unit 50 is rotated by the gearing unit 450 through the gear 55. And then the inserted disc 100 is transferred onto the turntable 7 by the rotated transfer roller 52. When the disc 100 is positioned on the turntable 7 under the lifted clamper unit 24, the link plate 37 is pressed for a short interval in the forward direction by the lock-release projection 39, which interlocks to the movement of the guide pins of the disc loading unit 97 as shown in FIG. 6.

When the link plate 37 is pressed for a short interval in the forward direction, the pinion 44 rotated by the reversible motor portion 43 meshes with the rack portion 43, and thereby the link plate 37 is slid in the forward direction as shown in FIG. 7.

In the forward movement of the link plate 37, the projections 35 on the rotary plate 4 are moved by the cam recesses 45 of the link plate 37, and thereby the rotary plate 4 is rotated around the rotary shaft 32 in a clockwise direction as shown in FIG. 10. As a result, the lock plate 20 of the first lock unit 3 is slid by the connecting arm 31 in the backward direction opposite to the movement of the link plate 37.

As shown in FIG. 13, in the backward movement of the lock plate 20, the lift lever 25 is rotated by means of the engagement of the cam groove 30 of the lift lever 25 with the cam projection 29 of the lock plate 20, and thereby the end member 25a of the lift lever 25 is moved downward. At the same time, the disc 100 positioned on the turntable 7 is held between the turntable 7 and the clamper unit 24, which is normally urged in a downward direction by the coil spring 19. And the lock pins 20a of the lock plate 20 are positioned in the wide and deep portion 9a from the narrow and shallow portion 9b of the lock-pin recess 9 of the floating unit 2 by the backward movement of the lock plate 20.

In the forward movement of the link plate 37 shown in FIG. 7, the first spring bracket 56, which is fixed to roller arm 53 of the disc transfer unit 50, is moved along the cam groove 57, and thereby the roller arm 53 is rotated around the support shaft 54 in a downward direction. As a result, the gear 55 for rotating the transfer roller 52 is disconnected from the gearing unit 450, thereby stopping the rotation of the transfer roller 52. At the same time, the engagement member 98 of the disc transfer unit 50 removes from the receiving member 111, and thereby the floating unit 2 does not receive directly a motion induced by the backward movement of the chassis 1, namely is in the floating state.

In the second lock unit 70 shown in FIGS. 14 to 16, when the roller arm 53 of the disc transfer unit 50 is rotated in a counterclockwise direction as shown in FIG. 16, the first locking member 72 rotates around the shaft 76 in a clockwise direction, and thereby the first recess 74 of the first locking member 72 removes from the hocking projection 71 fixed to the floating unit 2. At the same time, the second recess 75 of the second locking member 73 also removes from the locking projection 71.

When the photodiode as a position sensor detects the disc 100 securely positioned on the turntable 7, the reversible motor 36 stops to rotate.

After the above-mentioned loading operation for transferring the disc 100 on the turntable 7, the floating unit 2 of the disc player is completely in the unlocking state, namely in a floating state, and thereby the floating unit 2 is movably supported by the vibration-damping units 10 only. As a result, the disc 100 can be played on the turntable 7 of the floating unit 2 without receiving the vibrations from the chassis 1.

In case of the ejecting operation for ejecting the disc 100 from the disc player, the reversible motor 36 is rotated in an opposite direction against the loading operation by flicking an ejection switch (not shown). And the link plate 37 is operated in the backward direction (shown by an arrow E in FIG. 7) by the rotation of the pinion 44, which is connected to the reversible motor 36 through the gearing unit 450. When the link plate 37 is slid in the backward direction, the rotary plate 4 is rotated in a counterclockwise direction in FIG. 10, and the lock plate 20 is slid in the forward direction. When the lock plate 20 is slid in the forward direction, the lift lever 25 is moved by means of the engagement between the cam groove 30 and the cam projection 29 of the lock plate 20, and thereby the clamper unit 24 is lifted against spring tension of the coil spring 19 as shown in FIG. 12. In the last step of the ejecting operation, the lock pins 20a of the lock plate 20 are inserted into the narrow and shallow portion 9b of the lock-pin receiver 9, thereby surely locking the floating unit 2.

In the ejecting operation (FIG. 6), when the link plate 37 is slid in the backward direction, the roller arm 53 of the disc transfer unit 50 is moved along the shape of the cam groove 57 to be rotated upwardly, and thereby the engagement member 98 of the disc transfer unit 50 abuts to the receiving member 111 of the floating unit 2. At the same time, the transfer roller 52 of the disc transfer unit 50 is positioned to elastically contact the disc 100, and the gear 55 of the transfer roller 52 meshes with the gear 96 of the gearing unit 450. As a result, the transfer roller 52 of the disc transfer unit 50 is rotated to eject the disc 100 in an opposite direction against the loading direction.

In the ejecting operation of the second lock unit 70, when the roller arm 53 of the disc transfer unit 50 is moved in the upward direction, the first locking member 72 is rotated around the shaft 76 so as to engage between the first recess 74 and the locking projection 71 of the floating unit 2. At the same time, the second locking member 73 is slid in the backward direction (shown by an arrow G in FIG. 16) so that the locking projection 71 engages with the small hole portion 75b of the second recess 75.

In the above-mentioned locking state of the floating unit 2, the disc 100 (FIG. 6) is transferred to be ejected from the slot 90 by the rotation of the transfer roller 52. When the photodiode, such as a position sensor, detects the ejected disc 100 at the ejecting position in the slot 90, the reversible motor 36 is stopped.

Apart from the above-mentioned embodiment wherein the floating unit 2 has the lock-pin receivers 9, and the lock plate 20 has the lock pins 20a, a modified embodiment may be such that a floating unit has lock pins, and the lock plate has lock-pin receivers.

According to the present invention, in the locking state of the floating unit 2, the center of the rotary shaft 32 of the rotary plate 4 is arranged on the virtual straight line established between the connecting points of the connecting arm 31 for the rotary plate 4 and lock plate 20. Therefore, if the impactive force is applied to the locked floating unit 2 in the backward direction, the impactive force is not conveyed to the lock drive unit 5 because the rotary plate 4 is not rotated by the impactive force. As a result, by the above-mentioned simple mechanism in the disc player of the present invention, the engagement portions in the lock drive unit 5 are prevented from sticking with each other.

According to the present invention, the disc transfer unit 50 and the disc loading unit 97 are provided in the chassis 1 of the disc player, and the disc loading unit 97 has the lock-release projection 39 interlocking to the guide operation for the disc 100. And the link plate 37 interlocking to the operation of the lock-release projection 39 is provided for driving to rotary plate 4. Since these components for locking the floating unit 2 are driven by the reversible motor 36, which is used for driving the disc transfer unit 50 as before, these components can be applied to the already-existing disc player.

According to the present invention, since the disc player has the engagement member 98, which is arranged to press the floating unit 2 in a backward direction in the disc transfer operation so as to prevent the floating unit 2 from moving in a forward direction, and to remove from the floating unit 2 in the replaying operation of the disc 100, the floating unit 2 of the disc player of the present invention is securely locked to the chassis 1 against the forward movement of the floating unit 2 in the disc transfer operation.

According to the present invention, one side of the floating unit 2 has the lock-pin receiver 9 of the first lock unit 3, and the other side has the locking projection 71 of the second lock unit 70. And the chassis has a pair of the locking members 72, 73, which are arranged to face the locking projection 71, and which have recesses 74, 75 for engaging the locking projection 71 overlapping each other by interlocking to the disc transfer operation of the disc transfer unit 50. Therefore, the floating unit 2 of the disc player of the present invention can be locked to the chassis 1 with reliability.

According to the present invention, the first lock unit 3 has the lock pin 20a of the lock plate 20 and the lock-pin receiver 9 having the wide and deep portion 9a and the narrow and shallow portion 9b. The lock pin 20a is positioned in the wide and deep portion 9a in the unlocking state, and is positioned in the narrow and shallow portion 9b so as to lock the floating unit 2 to the chassis 1. And the lock pin 20a to be inserted into the lock-pin receiver 9 is formed to have a tapered top-end and a rounded tip thereof. Therefore, in case of the unlocking state, there is little contact between the lock pin 20a and the lock-pin receiver 9, and resistances owing to the contact is reduced in the movements of the lock pin 20 toward the narrow and shallow portion 9b, thereby increasing the reliability for making a locking state.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A locking mechanism for a floating unit in a disc player comprising:

a chassis, a floating unit including a turntable for rotating a disc, a pickup for reading data on said disc, and at least one lock-pin receiver at a side face thereof, said floating unit being connected to said chassis through vibration-damping units, a lock unit having a lock plate supported slidably in a forward direction and a backward direction in a side portion of said chassis, said lock unit locks said floating unit at a forward position by inserting a lock pin of said lock plate into a narrow and shallow portion of said lock-pin receiver, and unlocks said floating unit at a backward position by removing said lock pin from said narrow and shallow portion, a rotary plate connected to said lock unit through a connecting arm, said rotary plate being rotatably supported around a rotary shaft by said chassis so as to slide said lock plate in said forward direction and said backward direction by reversible rotations of said rotary plate, said rotary shaft being arranged on a virtual straight line established between a connecting point of said connecting arm to said lock plate and another connecting point of said connecting arm to said rotary plate when said lock plate is positioned at said forward position, and a lock drive unit having a reversible motor for driving said rotary plate.

2. A lock mechanism for a floating unit in a disc player in accordance with claim 1, wherein said chassis holds a disc transfer unit for transferring a disc to said turntable, and a disc loading unit for guiding said disc on said turntable, said disc loading unit having a lock-release projection interlocking to a guide operation for said disc, and said lock drive unit has a link plate which is for operating said rotary plate, and said link plate is driven by said reversible motor when said lock-release projection is operated by said disc loading unit.

3. A lock mechanism for a floating unit in a disc player in accordance with claim 2, wherein said disc transfer unit has an engagement member, which presses said floating unit in a backward direction so as to control a forward movement of said floating unit in a disc transferring operation, and is removed from said floating unit in a disc reproducing operation.

4. A lock mechanism for a floating unit in a disc player in accordance with claim 3, wherein said floating unit has a locking projection at one side face, which is different from said side face having said lock-pin receiver, said chassis has a pair of locking members at a side face facing said locking projection, and one of said locking members has a recess and the other of said locking members has a hole which cooperatively engage with said locking projection by pinching said locking projection with edges of said recess and said hole when said disc transfer unit is in a disc transferring operation.

5. A lock mechanism for a floating unit in a disc player in accordance with claim 4, wherein said lock-pin receiver has a wide and deep portion where said lock pin of said lock plate is positioned in an unlocking state of said floating unit, at an opposite end to said narrow and shallow portion, and said lock pin is formed to have a tapered top-end and a rounded tip.

6. A lock mechanism for a floating unit in a disc player in accordance with claim 4 or 5, wherein in a locking state, a rounded tip of said lock pin abuts a bottom of said narrow and shallow portion in said lock-pin receiver provided on said one side of said floating unit, and said locking projection of said floating unit abuts one of said locking members, and in an unlocking state, said rounded tip of said lock pin is removed from said bottom of said lock-pin receiver and said locking projection is removed from said one of said locking members.

7. A disc player comprising:

a chassis, a floating unit including a turntable for rotating a disc, a pickup for reading data on said disc, and at least one lock-pin receiver at a side face thereof, said floating unit being connected to said chassis through vibration-damping units, a lock unit having a lock plate supported slidably in a forward direction and a backward direction in a side portion of said chassis, said lock unit locks said floating unit at a forward position by inserting a lock pin of said lock plate into a narrow and shallow portion of said lock-pin receiver, and unlocks said floating unit at a backward position by removing said lock pin from said narrow and shallow portion, a rotary plate connected to said lock unit through a connecting arm, said rotary plate being rotatably supported around a rotary shaft by said chassis so as to slide said lock plate in said forward direction and said backward direction by reversible rotations of said rotary plate, said rotary shaft being arranged on a virtual straight line established between a connecting point of said connecting arm to said lock plate and another connecting point of said connecting arm to said rotary plate when said lock plate is positioned at said forward position, and a lock drive unit having a reversible motor for driving said rotary plate, said floating unit has a locking projection at one side face, which is different from said side face having said lock-pin receiver, said chassis has a pair of locking members at a side face facing said locking projection, and one of said locking members has a recess and the other of said locking members has a hole, which cooperatively engage with said locking projection by pinching said locking projection with edges of said recess and said hole when said disc transfer unit is in a disc transferring operation.

* * * * *